US012294857B2

(12) United States Patent
Yoshikawa

(10) Patent No.: US 12,294,857 B2
(45) Date of Patent: May 6, 2025

(54) COMMUNICATION APPARATUS FOR PROVIDING A SETTING SCREEN HAVING HIGH CONVENIENCE OF USER INPUT OF COMMUNICATION PARAMETERS, CONTROL METHOD, AND STORAGE MEDIUM

(71) Applicant: CANON KABUSHIKI KAISHA, Tokyo (JP)

(72) Inventor: Yuki Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 17/484,510

(22) Filed: Sep. 24, 2021

(65) Prior Publication Data
US 2022/0104014 A1    Mar. 31, 2022

(30) Foreign Application Priority Data

Sep. 28, 2020 (JP) .................................. 2020-162161

(51) Int. Cl.
| | |
|---|---|
| *H04W 12/06* | (2021.01) |
| *G06F 21/45* | (2013.01) |
| *H04W 12/08* | (2021.01) |
| *H04W 76/11* | (2018.01) |
| *H04L 29/06* | (2006.01) |

(52) U.S. Cl.
CPC .......... *H04W 12/068* (2021.01); *G06F 21/45* (2013.01); *H04W 76/11* (2018.02)

(58) Field of Classification Search
CPC ...... H04W 12/068; H04W 76/11; G06F 21/45
USPC .............................................................. 726/6
See application file for complete search history.

(56) References Cited

U.S. PATENT DOCUMENTS

| | | | |
|---|---|---|---|
| 9,015,288 B2* | 4/2015 | Kawai ................. | H04L 41/0803 709/228 |
| 11,109,310 B1* | 8/2021 | Crespi ................... | H04W 48/20 |
| 11,411,942 B1* | 8/2022 | Dhammawat ....... | H04W 12/041 |
| 2011/0235549 A1* | 9/2011 | Ahlers .................... | H04L 41/08 370/255 |

(Continued)

FOREIGN PATENT DOCUMENTS

| | | | | |
|---|---|---|---|---|
| CN | 103229581 B | * 12/2016 | ............ | H04W 28/26 |
| CN | 113518388 A | * 10/2021 | ........... | H04L 5/0023 |

(Continued)

*Primary Examiner* — Haresh N Patel
(74) *Attorney, Agent, or Firm* — Canon U.S.A., Inc. IP Division

(57) ABSTRACT

A communication apparatus determines whether to use, for connection to another communication apparatus forming a wireless network, an identifier different from a service set identifier (SSID) of the wireless network and a password of the wireless network, based on one of a Beacon, a Probe Response, or a Simultaneous Authentication of Equals (SAE) Commit received from the other communication apparatus, and controls a display unit in such a manner that, in a case where it is determined not to use the identifier for connection to the other communication apparatus, the display unit does not display a screen for inputting the identifier and, in a case where it is determined to use the identifier for connection to the other communication apparatus, the display unit displays the screen for inputting the identifier.

13 Claims, 18 Drawing Sheets

(56) References Cited

U.S. PATENT DOCUMENTS

| | | | |
|---|---|---|---|
| 2013/0298194 A1* | 11/2013 | Nakajima | H04W 12/069 |
| | | | 726/3 |
| 2016/0205076 A1* | 7/2016 | Shimizu | H04W 48/18 |
| | | | 380/255 |
| 2017/0374548 A1* | 12/2017 | Mason | H04L 63/062 |
| 2020/0137568 A1* | 4/2020 | Takeuchi | H04W 12/08 |
| 2020/0162915 A1* | 5/2020 | Dhammawat | H04W 12/068 |
| 2021/0243604 A1* | 8/2021 | Lepp | H04W 12/55 |
| 2021/0251019 A1* | 8/2021 | Sayed | H04L 41/0806 |
| 2022/0231797 A1* | 7/2022 | Song | H04L 1/1861 |

FOREIGN PATENT DOCUMENTS

| | | | | |
|---|---|---|---|---|
| EP | 3934140 A1 | * | 1/2022 | ........... H04L 1/0006 |
| JP | 2010136308 A | * | 6/2010 | |
| JP | 2021103806 | * | 12/2019 | |
| JP | 2021057756 A | * | 4/2021 | ........... H04W 12/06 |
| JP | 2021064910 A | * | 4/2021 | |
| JP | 2021103806 A | * | 7/2021 | ........... H04W 12/04 |
| JP | 7387421 B2 | * | 11/2023 | ........... H04L 9/0631 |
| KR | 20180045014 A | * | 5/2018 | |
| KR | 20160007404 A | * | 3/2020 | |

\* cited by examiner

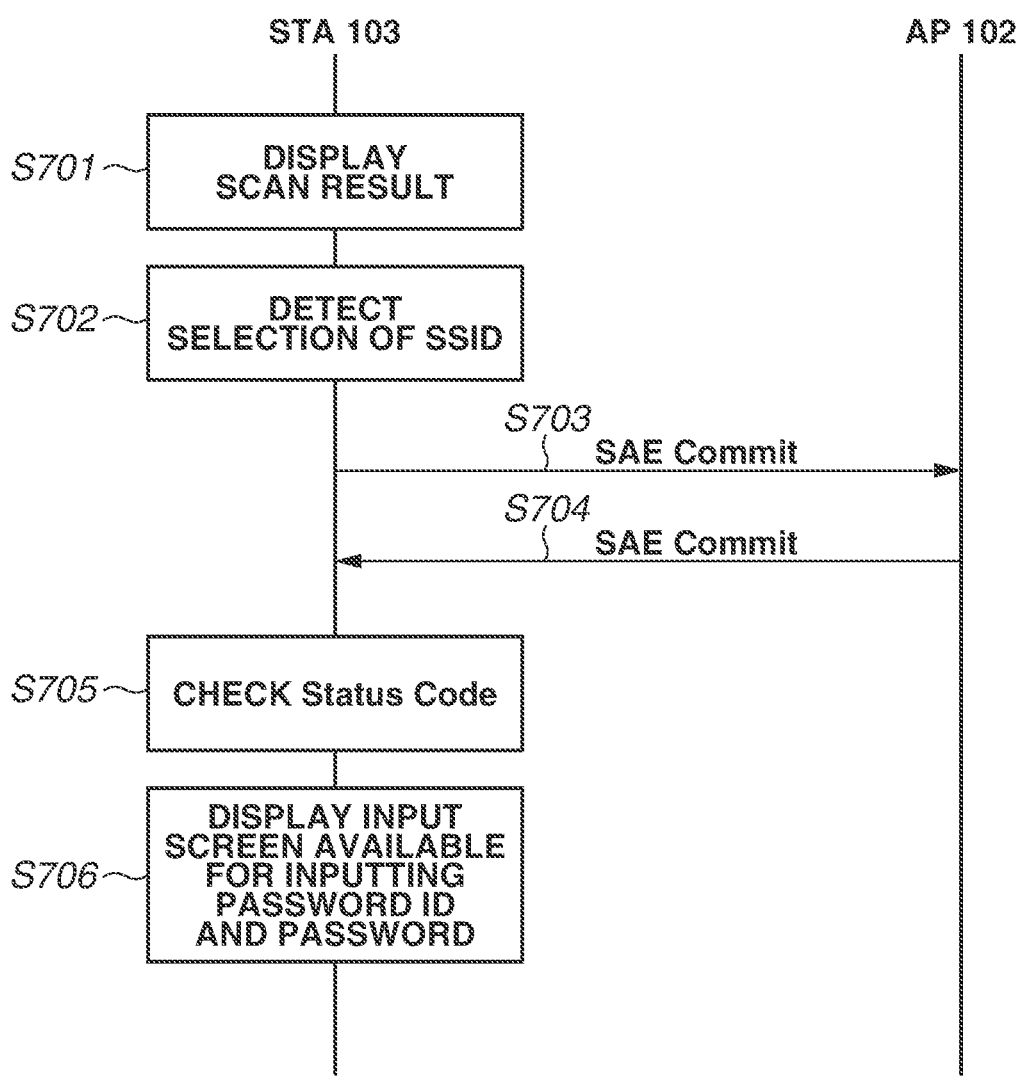

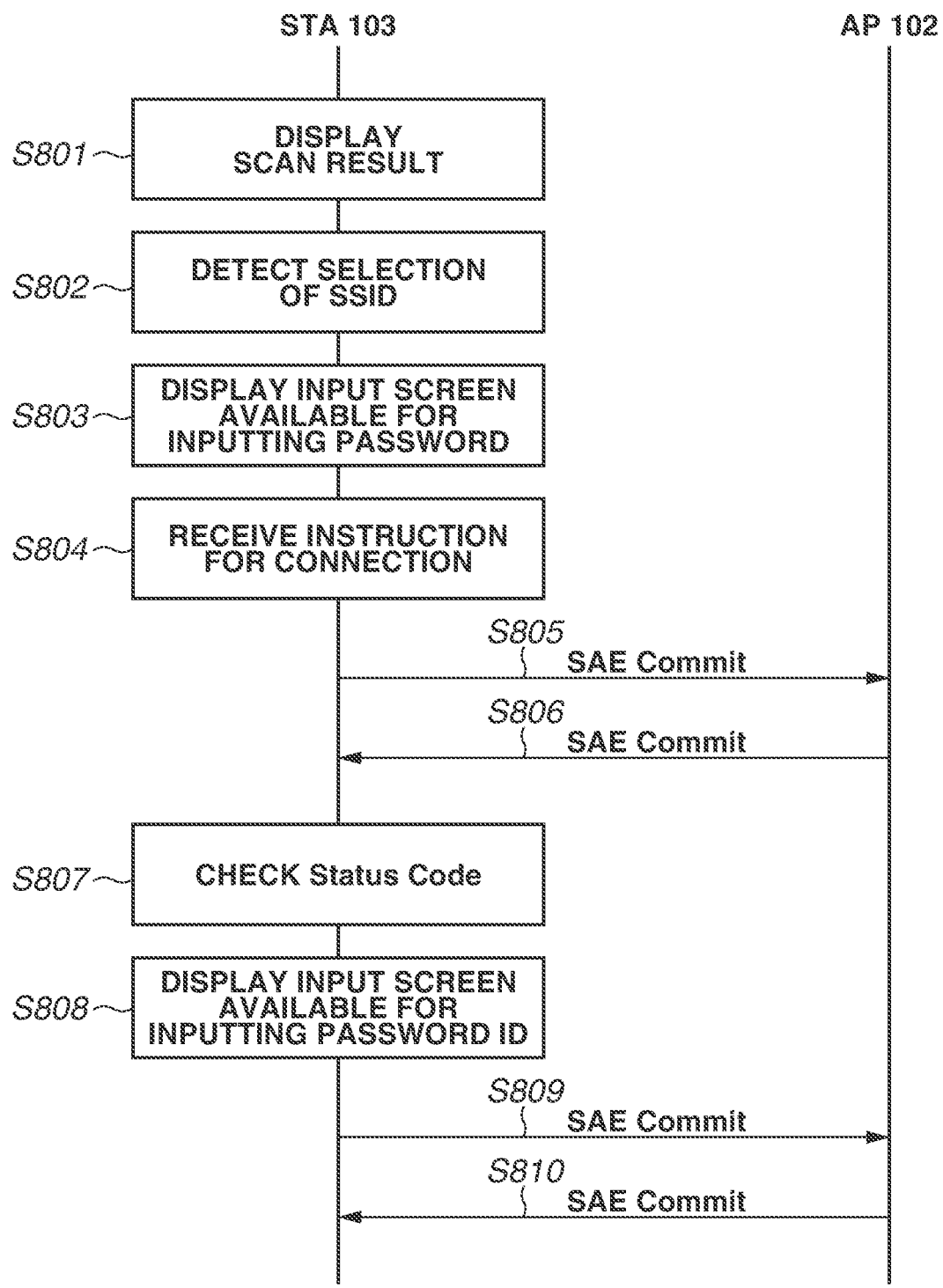

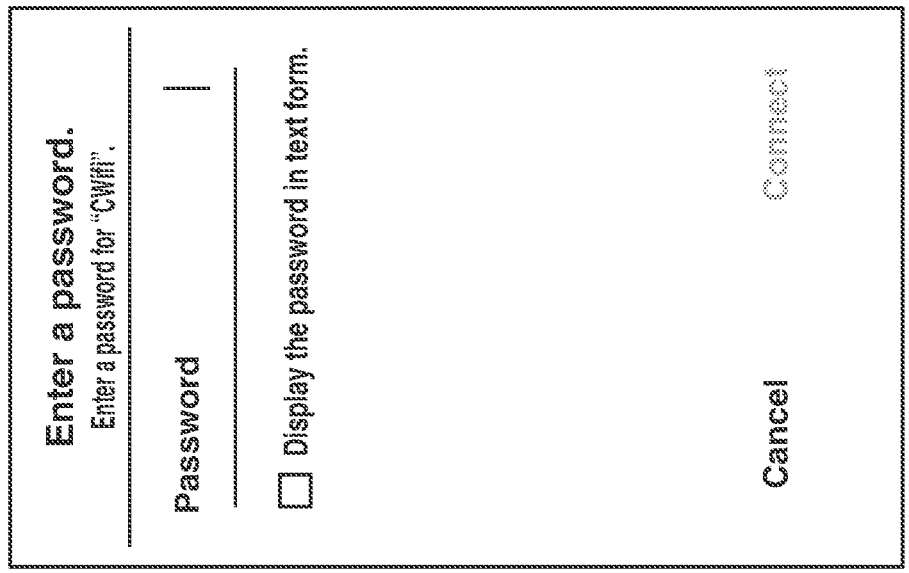
FIG.9B
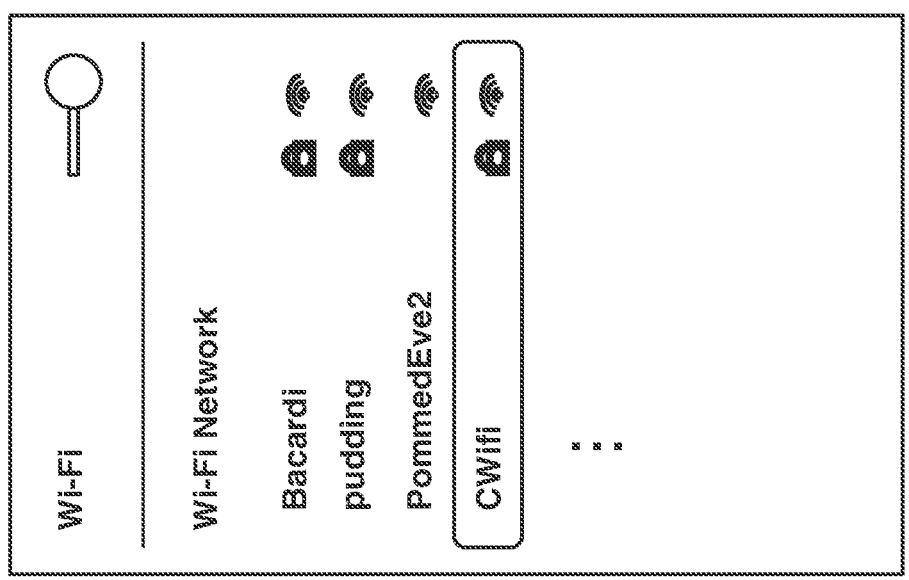
FIG.9A

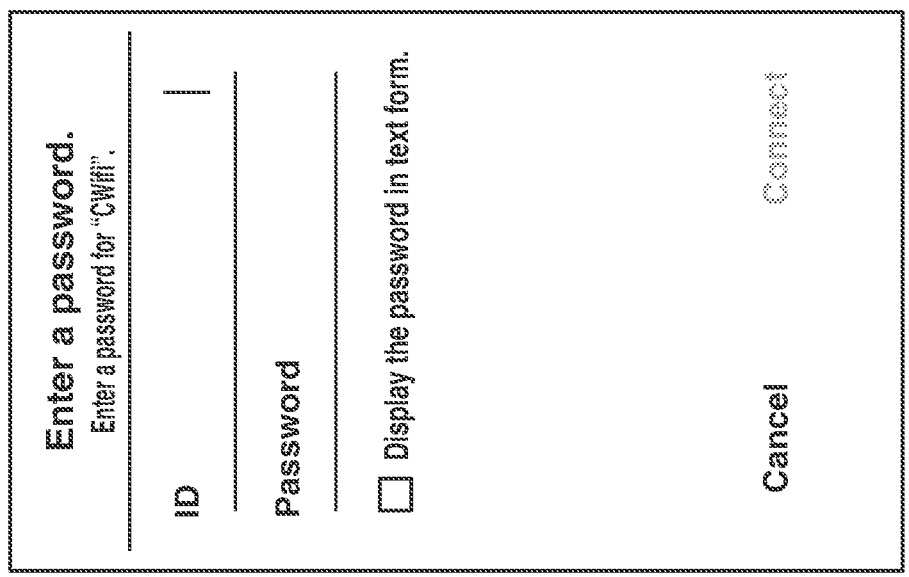
FIG.10B
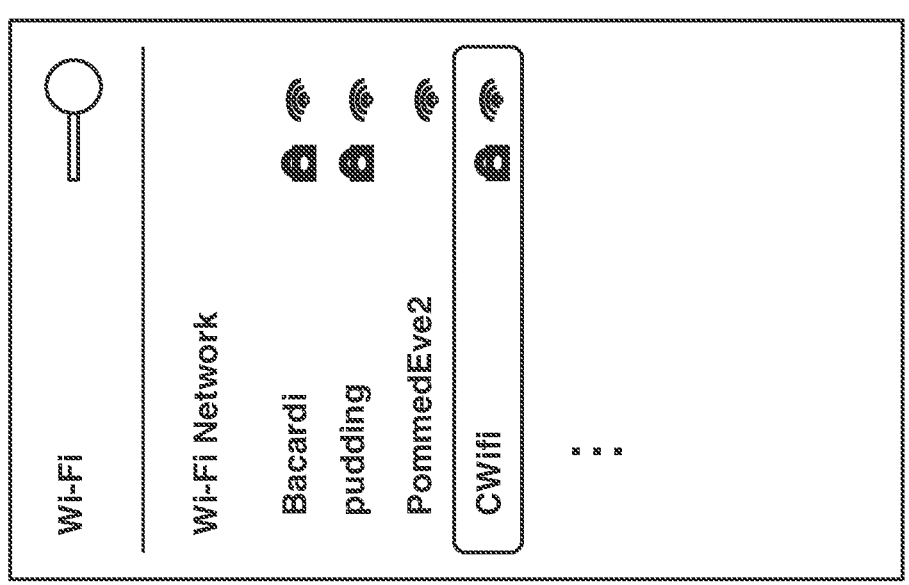
FIG.10A

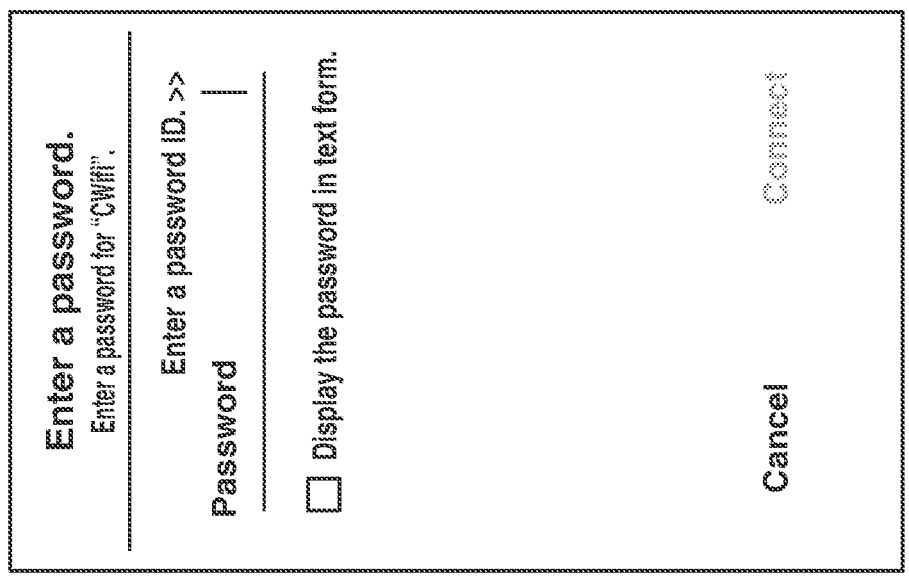
FIG. 11B
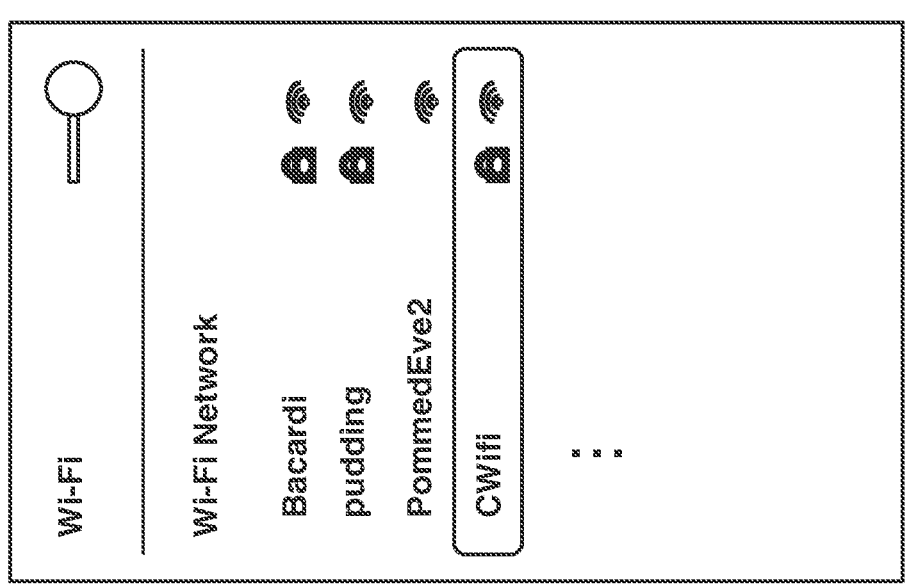
FIG. 11A

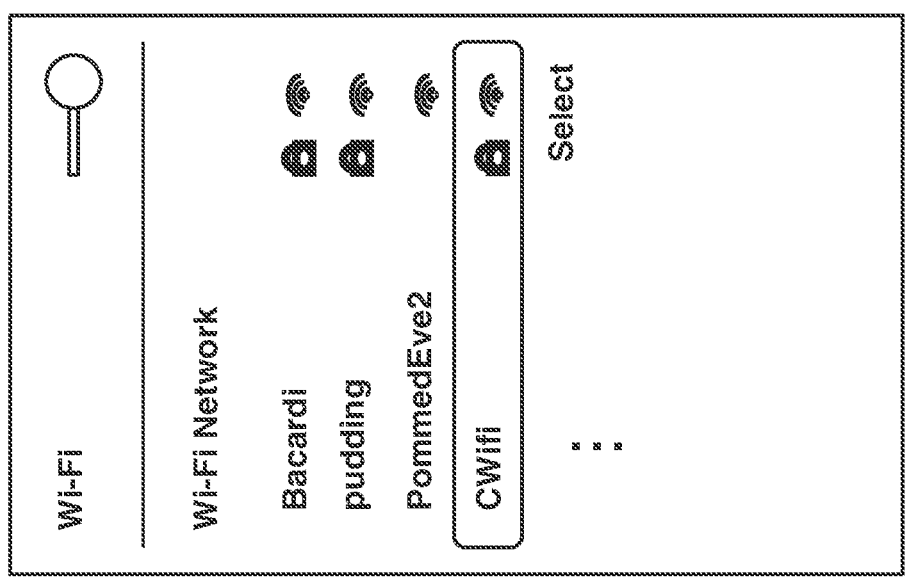
FIG. 13A
FIG. 13B

FIG.15

| 1501 | 1502 | 1503 | 1504 | 1505 | 1506 | 1507 | 1508 | |
|---|---|---|---|---|---|---|---|---|
| Element ID | Length | Version | Group Data Cipher Suite | Pairwise Cipher Suite Count | Pairwise Cipher Suite List | AKM Suite Count | AKM Suite List | ... |

COMMUNICATION APPARATUS FOR PROVIDING A SETTING SCREEN HAVING HIGH CONVENIENCE OF USER INPUT OF COMMUNICATION PARAMETERS, CONTROL METHOD, AND STORAGE MEDIUM

BACKGROUND

Field

Aspects of the present disclosure generally relate to setting of connection information about a wireless network.

Description of the Related Art

Currently, making a new method of password authentication available for connection to a WLAN is being considered for the Wi-Fi Protected Access 3 (WPA3) standard developed by the Wi-Fi Alliance. WLAN is an abbreviation for wireless local area network. In a conventional WLAN, to connect to an access point (AP) that forms a wireless network, it is necessary to input a service set identifier (SSID), which is an identifier of the AP, and a corresponding password to a station (STA). In the new method of password authentication which is being considered, using, in addition to an SSID and password conventionally used, a password identifier (ID) associated with the password, enables connecting to an access point. In such a system, the user needs to, after selecting an SSID corresponding to a wireless network to which the user intends to cause an STA to connect, input a password ID in addition to a password, thus causing the STA to connect to the wireless network.

In the WPA3 standard, not only the new password authentication using a password and a password ID but also the conventional password authentication using only a password is available. However, a user of an STA does not know whether a particular AP is using the new method of password authentication and, therefore, does not know whether a password ID is required for connection to a wireless network.

Japanese Patent Application Laid-Open No. 2010-136308 describes techniques and mechanisms for causing an available encryption method and authentication method to be displayed in response to an input password, but the techniques and mechanisms do not enable the user to determine, based on an input password, the necessity or lack of necessity of a password ID.

SUMMARY

Various embodiments of the present disclosure are generally directed to enabling a user to readily determine whether an identifier different from an SSID and a password is required for establishing a connection to a wireless network, thus improving user convenience.

According to one embodiment of the present disclosure, a communication apparatus includes a determination unit configured to determine whether to use, for connection to another communication apparatus forming a wireless network, an identifier different from a service set identifier (SSID) of the wireless network and a password of the wireless network. This determination is made based on one of the following: a Beacon, a Probe Response, or a Simultaneous Authentication of Equals (SAE) Commit received from the other communication apparatus. The communication apparatus also includes a display control unit configured to control a display unit in such a manner that, in a case where the determination unit determines not to use the different identifier for connection to the other communication apparatus, the display unit does not display a screen for inputting the different identifier and, in a case where the determination unit determines to use the different identifier for connection to the other communication apparatus, the display unit displays the screen for inputting the different identifier.

Further features of the present disclosure will become apparent from the following description of example embodiments with reference to the attached drawings.

BRIEF DESCRIPTION OF THE DRAWINGS

FIG. 7 is a sequence diagram illustrating an example of processing which the communication apparatus performs to display a screen for inputting information required for connection to the other communication apparatus according to one embodiment.

FIG. 8 is a sequence diagram illustrating another example of processing which the communication apparatus performs to display a screen for inputting information required for connection to the other communication apparatus according to one embodiment.

FIGS. 9A and 9B are diagrams illustrating examples of graphical user interfaces which the communication apparatus displays according to one embodiment.

FIGS. 10A and 10B are diagrams illustrating other examples of graphical user interfaces which the communication apparatus displays according to one embodiment.

FIGS. 11A and 11B are diagrams illustrating other examples of graphical user interfaces which the communication apparatus displays according to one embodiment.

FIGS. 13A and 13B are diagrams illustrating other examples of graphical user interfaces which the communication apparatus displays according to one embodiment.

FIG. 15 is a diagram illustrating an example of a frame format of a Robust Security Network Element (RSNE) which the communication apparatus transmits.

DESCRIPTION OF THE EMBODIMENTS

Various example embodiments, features, and aspects of the present disclosure will be described in detail below with reference to the drawings. Furthermore, configurations illustrated in the following example embodiments are merely examples, and the present invention should not be construed to be limited to the illustrated configurations.

Figure 1:
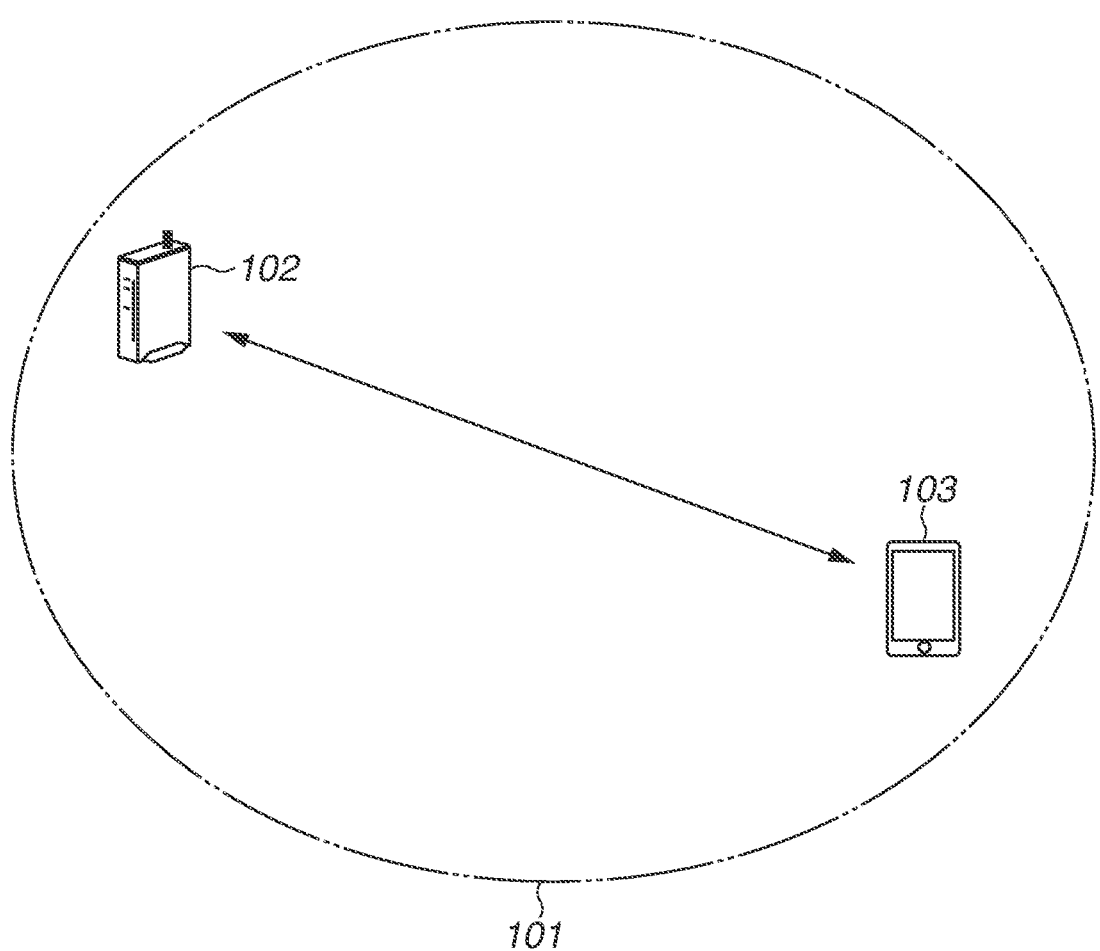
FIG. 1 is a diagram illustrating a configuration of a network to which a communication apparatus belongs according to one embodiment.

FIG. 1 illustrates a configuration of a network in which a communication apparatus 103 according to a first example embodiment participates. A communication apparatus 102 is a communication apparatus which operates as an access point (AP) assuming the role of forming a wireless network 101. Moreover, the communication apparatus 103 is a communication apparatus which operates as a station (STA) assuming the role of participating in a network formed by an AP.

Each communication apparatus is capable of performing wireless communication compliant with the IEEE 802.11 series standard developed by the Institute of Electrical and Electronics Engineers (IEEE). The IEEE 802.11 series standard is at least one of IEEE 802.11a, 802.11b, 802.11g, 802.11n, 802.11ac, 802.11ax, and 802.11be standards.

Each communication apparatus can be compatible with, in addition to the IEEE 802.11 series standard, another communication standard, such as Bluetooth®, NFC, UWB, Zigbee, or MBOA. Furthermore, UWB is an abbreviation for Ultra Wide Band, and MBOA is an abbreviation for Multi Band OFDM Alliance. Furthermore, OFDM is an abbreviation for Orthogonal Frequency Division Multiplexing. Moreover, NFC is an abbreviation for Near Field Communication.

UWB includes, for example, wireless Universal Serial Bus (USB), Wireless 1394, and Winet. Moreover, each communication apparatus can also be compatible with a communication standard for wired communication, such as wired local area network (LAN).

Each of the communication apparatus 102 and the communication apparatus 103 is capable of executing an encryption method and authentication method for wireless communication compliant with Wi-Fi Protected Access 3 (WPA3) developed by the Wi-Fi Alliance. Moreover, each communication apparatus can also be compatible with, in addition to WPA3, WPA and WPA2, which are legacy standards of WPA3.

In WPA3, besides a conventional method using a service set identifier (SSID) and a password as communication parameters used for connection to an AP, a method using an SSID, a password, and a password identifier (ID) as the communication parameters is available. Whether a password ID is required for connection to an AP is determined by the setting performed on the side of the AP. In an AP compatible with WPA3, it is possible to set a password ID essential or it is possible to set a password ID optional. It is possible to connect to an AP in which a password ID is set optional with use of or without use of a password ID. The user of an STA does not know how a password ID is set on the side of an AP and, therefore, also does not know whether a password ID is required for connection to the AP. In the case of trying to connect to such an AP, for example, if it is always possible to input a password ID to an input scree, even in a case where a password ID is set optional or unnecessary on the side of the AP, the user of the STA may think that a password ID is essential. Alternatively, for example, if inputting of a password ID being optional is displayed on an input screen for communication parameters on the side of the STA, even in a case where a password ID is set essential on the side of the AP, the user of the STA may think that a password ID is unnecessary. Therefore, the communication apparatus 103 according to the first example embodiment displays an appropriate input screen for communication parameters based on setting about a password ID performed on the side of the AP, thus enabling the user to readily recognize a communication parameter required to be input.

Specific examples of the communication apparatus 102 include a wireless LAN router and a personal computer (PC), but are not limited to these. The communication apparatus 102 can be any communication apparatus as long as it is capable of performing wireless communication compliant with the IEEE 802.11ax standard with respect to another communication apparatus. Moreover, specific examples of the communication apparatus 103 include a camera, a tablet, a smartphone, a PC, a mobile phone, and a video camera, but are not limited to these. The communication apparatus 103 only needs to be a communication apparatus capable of performing wireless communication compliant with the IEEE 802.11ax standard with respect to another communication apparatus. Moreover, while the network 101 illustrated in FIG. 1 is a network configured with one AP and one STA, the numbers of APs and STAs are not limited to these.

Figure 2:
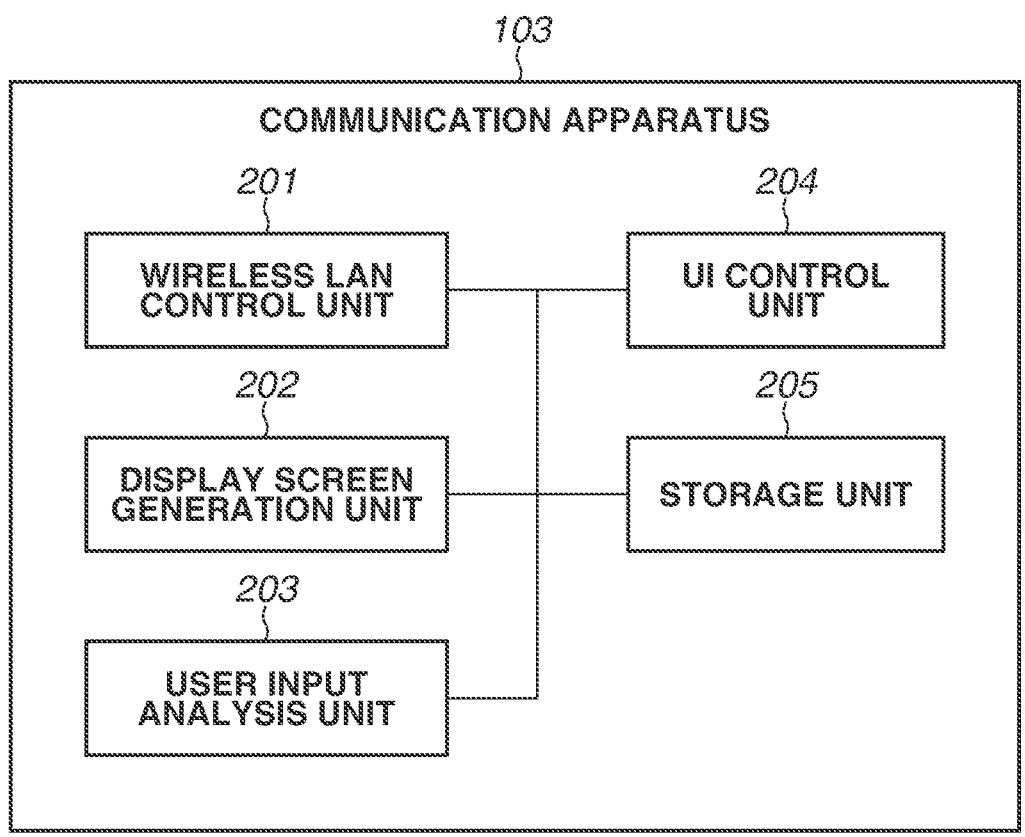
FIG. 2 is a diagram illustrating a functional configuration of the communication apparatus according to one embodiment.

FIG. 2 illustrates a functional configuration of the communication apparatus 103. The communication apparatus 103 includes a wireless LAN control unit 201, a display screen generation unit 202, a user input analysis unit 203, a UI control unit 204, and a storage unit 205. Furthermore, UI is an abbreviation for user interface.

The wireless LAN control unit 201 is configured to include pieces of hardware for performing transmission and reception of a wireless signal with respect to another communication apparatus and a program for controlling such pieces of hardware. The wireless LAN control unit 201 performs control of wireless communication according to the IEEE 802.11 series standard. Furthermore, while, in FIG. 2, the communication apparatus 103 is illustrated as including one wireless LAN control unit 201, the first example embodiment is not limited to this, and the communication apparatus 103 can include two or more wireless LAN control units.

The UI control unit 204 is configured to include pieces of hardware related to a user interface, such as a touch panel or a button, used to receive an operation performed by the user on the communication apparatus 103 and a program for controlling such pieces of hardware. The program included in the UI control unit 204 operates to send the content input by the user obtained from an input unit 304 illustrated in FIG. 3 to the user input analysis unit 203 described below. Moreover, the program included in the UI control unit 204 operates to send an image generated by the display screen generation unit 202 described below to an output unit 305 illustrated in FIG. 3. Additionally, the UI control unit 204 also has the function of, for example, presenting information such as a sound output to the user.

The user input analysis unit 203 receives information obtained by the UI control unit 204, and analyses the content designated by the user. Specifically, the user input analysis unit 203 analyses information related to control which is to be performed by the wireless LAN control unit 201, and analyses information related to a screen which is to be generated by the display screen generation unit 202. The information related to a display screen is transmitted to the display screen generation unit 202.

The display screen generation unit 202 generates the content which is to be displayed as a UI from information received from the user input analysis unit 203 and information stored in the storage unit 205, and sends the generated content to the UI control unit 204. The screen which is to be generated by the display screen generation unit 202 can be changed according to the user input or the elapse of time.

The storage unit 205 is configured to include a program for controlling, for example, a read-only memory (ROM) and a random access memory (RAM), which store a program and data based on which the communication apparatus 103 operates.

Figure 3:
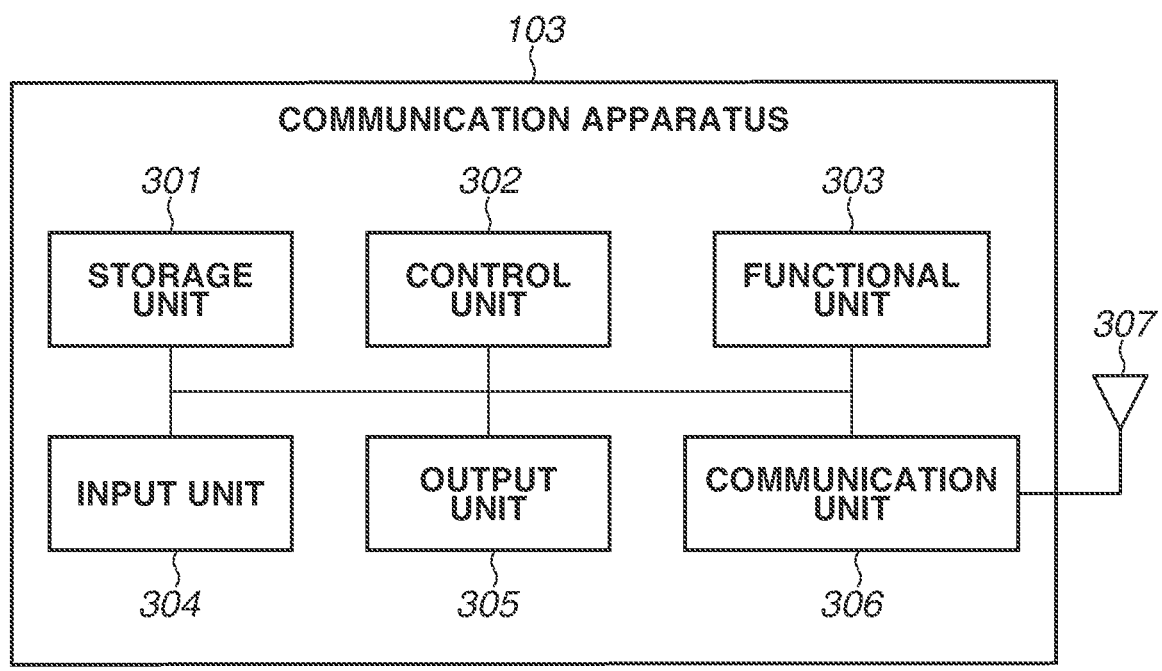
FIG. 3 is a diagram illustrating a hardware configuration of the communication apparatus according to one embodiment.

FIG. 3 illustrates a hardware configuration of the communication apparatus 103 according to the first example embodiment. The communication apparatus 103 includes a storage unit 301, a control unit 302, a functional unit 303, an input unit 304, an output unit 305, a communication unit 306, and an antenna 307.

The storage unit 301 is configured with one or more memories, such as ROMs or RAMs, and stores a computer program for various operations described below and various pieces of information, such as communication parameters used for wireless communication. ROM is an abbreviation for read-only memory, and RAM is an abbreviation for random access memory. Furthermore, examples of the storage unit 301 to be used include, in addition to a memory such as a ROM or RAM, various storage media, such as a flexible disk, a hard disk, an optical disc, a magneto-optical disc, a compact disc read-only memory (CD-ROM), a compact disc recordable (CD-R), a magnetic tape, a non-volatile memory card, and a digital versatile disc (DVD). Moreover, the storage unit 301 can include, for example, a plurality of memories.

The control unit 302 is configured with, for example, one or more processors, such as CPUs or MPUs, and controls the entire communication apparatus 103 by executing the computer program stored in the storage unit 301. Furthermore, the control unit 302 can be configured to control the entire communication apparatus 103 with the computer program stored in the storage unit 301 and an operating system (OS) operating in cooperation with each other. Moreover, the control unit 302 generates data or a signal (wireless frame) which is to be transmitted in communication with another communication apparatus. Furthermore, CPU is an abbreviation for central processing unit, and MPU is an abbreviation for micro processing unit. Moreover, the control unit 302 can be configured to include a plurality of processors, such as a multi-core processor, and control the entire communication apparatus 103 with the plurality of processors.

Moreover, the control unit 302 controls the functional unit 303 to perform predetermined processing operations, such as wireless communication, image capturing, printing, and projection. The functional unit 303 is hardware used for the communication apparatus 103 to perform predetermined processing operations.

The input unit 304 performs reception of various operations performed by the user. The output unit 305 performs various outputting operations to the user via a display unit, such as a monitor screen, or a loudspeaker. Here, the outputting operations to be performed by the output unit 305 can be, for example, displaying on a display unit such as a monitor screen, audio output by a loudspeaker, or vibration output. Furthermore, both the input unit 304 and the output unit 305 can be implemented by a single module, such as a touch panel. Moreover, the input unit 304 and the output unit 305 can be integrated with the communication apparatus 103 or can be separate from the communication apparatus 103.

The communication unit 306 performs control of wireless communication compliant with the IEEE 802.11 series standard. Moreover, the communication unit 306 can perform control of wired communication such as wired LAN. The communication unit 306 controls the antenna 307 to perform transmission and reception of signals for wireless communication generated by the control unit 302. The communication apparatus 103 can include a plurality of communication units 306. Furthermore, in a case where the communication apparatus 103 is compatible with, in addition to the IEEE 802.11 series standard, for example, the NFC standard or the Bluetooth standard, the communication apparatus 103 can perform control of wireless communication compliant with these standards. Moreover, in a case where the communication apparatus 103 is capable of performing wireless communication compliant with a plurality of communication standards, the communication apparatus 103 can be configured to include individual communication units and antenna units corresponding to the respective communication standards. The communication apparatus 103 performs communication of data, such as image data, document data, and vide data, with the communication apparatus 102 via the communication unit 306. Furthermore, the antenna 307 can be configured as a unit separate from the communication unit 306 or can be configured as a single module together with the communication unit 306.

The antenna 307 is an antenna capable of performing communication compliant with the IEEE 802.11 series standard. In the first example embodiment, the communication apparatus 103 is configured to include a single antenna, but can be configured to include antennas different with respect to respective frequency bands. Moreover, in the case of including a plurality of antennas, the communication apparatus 103 can be configured to include communication units 306 corresponding to respective antennas.

Furthermore, the communication apparatus 102 has a hardware configuration similar to that of the communication apparatus 103.

Figure 4:
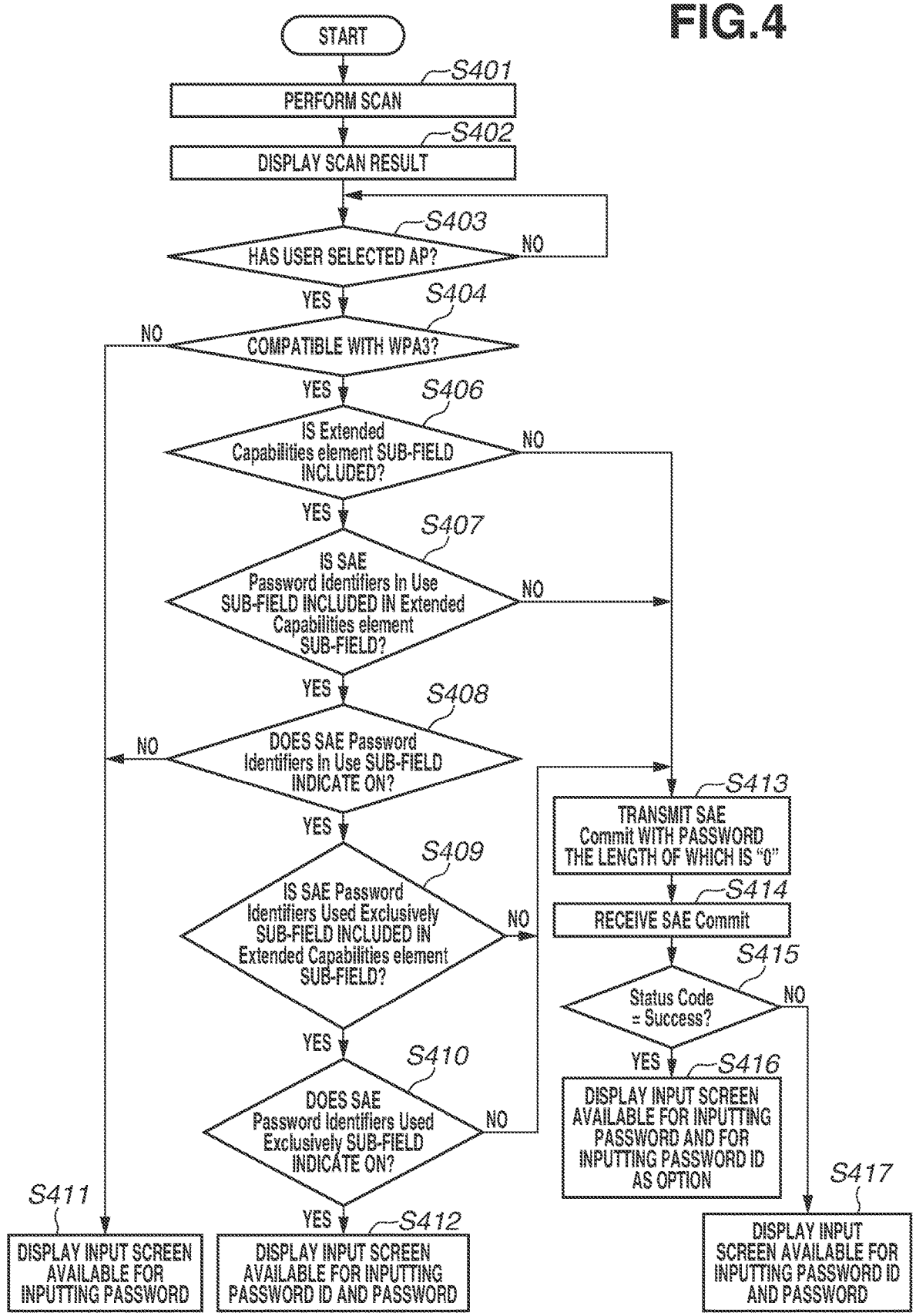
FIG. 4 is a flowchart illustrating processing which the communication apparatus performs to display a screen for inputting information required for connection to another communication apparatus according to one embodiment.

FIG. 4 is a flowchart illustrating processing which the communication apparatus 103 performs to display a screen for inputting information required for connection to the communication apparatus 102. The communication apparatus 103 starts processing in the present flowchart when being triggered by being instructed by the user to search for an AP to which the communication apparatus 103 connects. Alternatively, not only this, the communication apparatus 103 can start processing in the present flowchart at intervals of a predetermined time, or can start processing in the present flowchart in response to a predetermined application being activated.

In step S401, the communication apparatus 103 performs scan to search for an AP. The method for scan includes two methods. The first method is passive scan, in which the communication apparatus 103 awaits a Beacon frame or a Probe Response frame transmitted from an AP. In this case, the communication apparatus 103 does not transmit any signal and, therefore, is able to perform scan with lower power than the other scan method described below. Moreover, in a case where the communication apparatus 103 performs scan with a frequency band with which the communication apparatus 103 is not able to transmit a signal for search, such as Dynamic Frequency Selection (DFS) channel, the communication apparatus 103 performs scan using this method. Upon receiving a Beacon frame or a Probe Response frame, the communication apparatus 103 displays an AP which is a transmission source of the received frame as the detected AP in the form of a scan result in step S402 described below.

The second method is active scan, in which the communication apparatus 103 transmits a Probe Request frame and waits a Probe Response frame, which is a response from an AP. In this method, even in a case where an AP is operating as a stealth SSID, in which the AP transmits a Beacon frame not including information about the AP itself, the communication apparatus 103 is able to detect such an AP. Upon receiving a Probe Response frame, the communication apparatus 103 displays an AP which is a transmission source of the received frame as the detected AP in the form of a scan result in step S402 described below. Furthermore, even in the case of performing active scan, upon receiving a Beacon frame, the communication apparatus 103 is able to detect an AP which is a transmission source of the received frame.

The communication apparatus 103 can perform scan using only one of the above-mentioned methods or can perform scan using both of the above-mentioned methods. Moreover, the communication apparatus 103 performs scan until a predetermined time elapses from the start of the present flowchart. Alternatively, the communication apparatus 103 can continue performing scan until detecting a predetermined number of APs, or can continue performing scan until receiving an instruction for ending scan from the user.

In step S402, the communication apparatus 103 displays a result of the performed scan on a display unit. FIG. 9A illustrates an example of a screen which the communication apparatus 103 displays at that time. The communication apparatus 103 displays SSIDs of the APs detected in step S401 in the form of a list. Furthermore, outputting of the scan result is not only this, but can be outputting of sound or outputting of, for example, print.

Next, in step S403, the communication apparatus 103 determines whether the user has selected an AP (communication apparatus 102) based on the scan result. Specifically, the communication apparatus 103 determines whether the user has selected the SSID of a desired AP from among a list displayed as the scan result in step S402. Selection by the user can be performed by touching on a touch screen or can be performed by voice input. The communication apparatus 103 can be configured to perform displaying in such a way as to surround the SSID of the selected AP with a frame or in such a way as to change the color of a background around the SSID.

In step S404, the communication apparatus 103 determines whether the AP selected by the user is compatible with WPA3. Specifically, the communication apparatus 103 performs such determination based on information included in a Beacon frame or a Probe Response frame received from the AP selected by the user.

Figure 14:
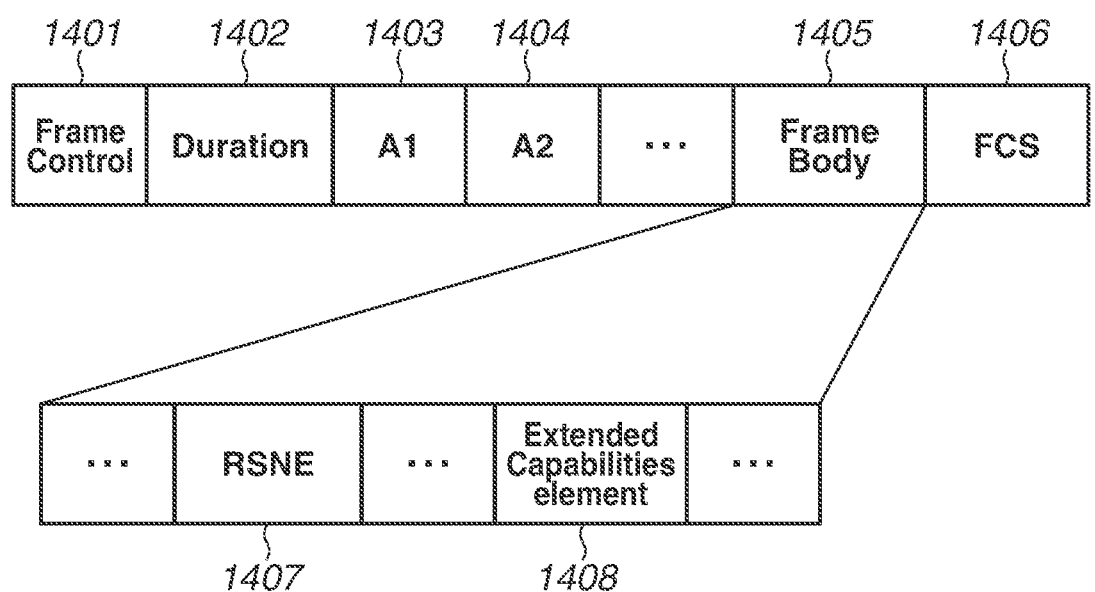
FIG. 14 is a diagram illustrating an example of a frame format of a Beacon frame or a Probe Response frame which the communication apparatus receives according to one embodiment.

FIG. 14 illustrates an example of a frame format of the Beacon frame or the Probe Response frame which the communication apparatus 103 has received. The frame format illustrated in FIG. 14 includes a Frame Control field 1401, a Duration field 1402, an A1 field 1403, and an A2 field 1404. The frame format illustrated in FIG. 14 further includes a Frame Body field 1405 and a Frame Check Sequence (FCS) field 1406. Moreover, the Frame Body field 1405 includes a Robust Security Network Element (RSNE) sub-field 1407 and an Extended Capabilities element (ECE) sub-field 1408. The communication apparatus 103 generates and transmits the above-mentioned fields in order from the Frame Control field 1401, which is the leftmost field of the frame format illustrated in FIG. 14.

Furthermore, at least one of the fields and sub-fields illustrated in FIG. 14 can be omitted.

The determination in step S404 illustrated in FIG. 4 is performed based on information included in the RSNE sub-field 1407. FIG. 15 illustrates an example of a frame format of the RSNE sub-field.

The RSNE sub-field includes information indicating, for example, an encryption method for communication, an encryption method for group keys, and the type of security which are used by a communication apparatus transmitting the present sub-field.

The RSNE sub-field includes an Element ID field 1501, a Length field 1502, a Version field 1503, and a Group Data Cipher Suite field 1504. The RSNE sub-field further includes a Pairwise Cipher Suite Count field 1505, and a Pairwise Cipher Suite List field 1506. The RSNE sub-field additionally includes an AKM Suite Count field 1507 and an AKM Suite List field 1508. The communication apparatus, which transmits the RSNE sub-field, generates and transmits the above-mentioned fields in order from the Element ID field 1501, which is the leftmost field of the frame format illustrated in FIG. 15. Furthermore, at least one of the fields illustrated in FIG. 15 can be omitted.

The Element ID field 1501 has "48" entered therein, which is a value indicating that the present sub-field is the RSNE sub-field.

Combinations each including a value (Suite type) included in the AKM Suite List field 1508 and a type of authentication method and a hash function indicated by the value are shown in Table 1.

Furthermore, the correspondence relationship between values and the types of authentication method and hash functions shown in Table 1 is merely an example, and the present example embodiment is not limited to this configuration.

TABLE 1

| OUI | Suite type | Type of authentication method | Hash function |
|---|---|---|---|
| 00-0F-AC | 0 | Reserved | Reserved |
| 00-0F-AC | 1 | Authentication using IEEE Std 802.1X or PMKSA caching | SHA-1 |
| 00-0F-AC | 2 | PSK | SHA-1 |
| 00-0F-AC | 3 | Authentication using FT in IEEE Std 802.1X | SHA-256 |
| 00-0F-AC | 4 | Authentication using FT in PSK | SHA-256 |
| 00-0F-AC | 5 | Authentication using IEEE Std 802.1X or PMKSA caching | SHA-256 |
| 00-0F-AC | 6 | PSK | SHA-256 |

TABLE 1-continued

| OUI | Suite type | Type of authentication method | Hash function |
|---|---|---|---|
| 00-0F-AC | 7 | TDLS | SHA-256 |
| 00-0F-AC | 8 | Authentication using SAE or PMKSA caching | SHA-256 |
| 00-0F-AC | 9 | Authentication using FT in SAE | SHA-256 |
| 00-0F-AC | 10 | APPeerKey authentication or authentication using PMKSA caching | SHA-256 |
| 00-0F-AC | 11 | Authentication with Suite B using IEEE Std 802.1X or PMKSA caching | SHA-256 |
| 00-0F-AC | 12 | Authentication with Suite B using IEEE Std 802.1X or PMKSA caching | SHA-384 |
| 00-0F-AC | 13 | Authentication using FT in IEEE Std 802.1X | SHA-384 |
| 00-0F-AC | 14 | FILS of SHA-256 in AES-SIV-256 or IEEE Std 802.1X | SHA-256 |
| 00-0F-AC | 15 | FILS of SHA-384 in AES-SIV-512 or IEEE Std 802.1X | SHA-384 |
| 00-0F-AC | 16 | FILS of SHA-256 in AES-SIV-256 using FT or IEEE Std 802.1X | SHA-256 |
| 00-0F-AC | 17 | FILS of SHA-384 in AES-SIV-512 using FT or IEEE Std 802.1X | SHA-384 |
| 00-0F-AC | 18 | Reserved | Reserved |
| 00-0F-AC | 19 | Authentication using FT in PSK | SHA-384 |
| 00-0F-AC | 20 | PSK | SHA-384 |
| 00-0F-AC | 21-255 | Reserved | Reserved |
| Other OUI or CID | Any | Vendor-specific | Vendor-specific |

Suite type=8 or 9 being included in the AKM Suite List field 1508 indicates that a transmission apparatus which transmits the RSNE sub-field is compatible with WPA3. Therefore, in a case where the value "8" or "9" is included in the AKM Suite List field 1508 received from the selected AP, the communication apparatus 103 sets the result of determination in step S404 illustrated in FIG. 4 as YES, and, in a case where a different value is included in the received AKM Suite List field 1508, the communication apparatus 103 sets the result of determination in step S404 illustrated in FIG. 4 as NO.

Furthermore, the value of the Suite type indicating that the selected AP is compatible with WPA3 is not limited to "8" or "9", and, for example, the value "21", which is set as "reserved" in Table 1, can indicate that the selected AP is compatible with WPA3. In this case, for example, in the Suite type=21, the type of authentication can correspond to SAE and the hash function can correspond to SHA-384. In such a case, even in the case of the Suite type=21, the communication apparatus 103 sets the result of determination in step S404 illustrated in FIG. 4 as YES.

Furthermore, while in the first example embodiment, the communication apparatus 103 determines whether the selected AP is compatible with WPA3 in step S404, in addition to this or instead of this, the communication apparatus 103 can determine whether the selected AP is compatible with a standard which is developed by the Wi-Fi Alliance subsequent to WPA3 (for example, WPA4). In this case, in a case where the Suite type is equal to any one of "21" and subsequent numbers, the communication apparatus 103 determines that the selected AP is compatible with a standard which is developed by the Wi-Fi Alliance subsequent to WPA3, such as WPA4.

If the result of determination in step S404 illustrated in FIG. 4 is NO (NO in step S404), then in step S411, the communication apparatus 103 displays, on the display unit, a screen for inputting a password. In a case where the selected AP is not compatible with WPA3, since the AP never uses a password ID as communication parameters, the communication apparatus 103 displays an input screen available for inputting only a password as information required for connection without allowing inputting of a password ID. FIG. 9B illustrates an example of an input screen which the communication apparatus 103 displays in such a case. In the UI illustrated in FIG. 9B, there is no entry field for a password ID, and only an entry field for a password is displayed as a single entry field. Furthermore, the present example embodiment is not limited to this, and the communication apparatus 103 can be configured to display an entry field for a password ID in gray-out form. Alternatively, while the communication apparatus 103 displays an entry field for a password ID, if the user performs inputting to the entry field for a password ID, the communication apparatus 103 can be configured to issue an error notification, thus preventing the user from performing inputting.

On the other hand, if the result of determination in step S404 illustrated in FIG. 4 is YES (YES in step S404), then in step S406, the communication apparatus 103 determines whether the ECE sub-field 1408 is included in the Beacon frame or Probe Response frame received from the selected AP. If it is determined that the ECE sub-field is included (YES in step S406), the communication apparatus 103 advances the processing to step S407. On the other hand, if it is determined that the ECE sub-field is not included (NO in step S406), the communication apparatus 103 advances the processing to step S413.

Figure 16:
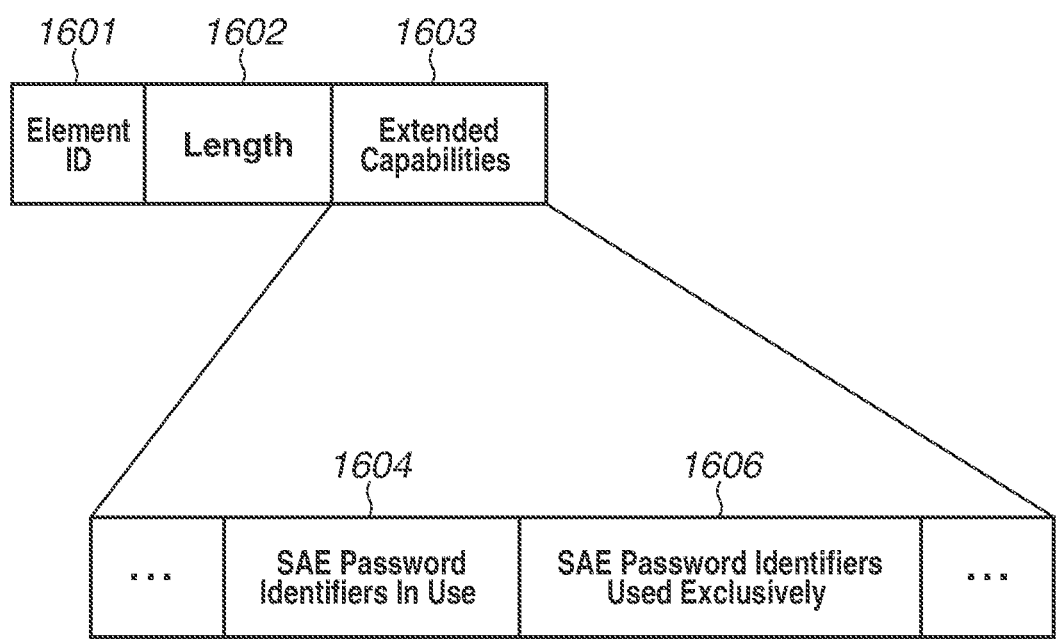
FIG. 16 is a diagram illustrating an example of a frame format of an Extended Capabilities element which the communication apparatus transmits according to one embodiment.

If the result of determination in step S406 is YES, the communication apparatus 103 checks various pieces of information included in the ECE sub-field. FIG. 16 illustrates an example of a frame format of the ECE sub-field. The ECE sub-field includes an Element ID field 1601, a Length field 1602, and an Extended Capabilities field 1603.

The Element ID field 1601 includes "127", which is a value indicating that the present sub-field is the ECE sub-field. The Extended Capabilities field 1603 includes an SAE Password Identifiers In Use sub-field 1604. Additionally, the Extended Capabilities field 1603 further includes an SAE Password Identifiers Used Exclusively sub-field 1606. A transmission apparatus for the ECE sub-field generates and transmits fields in order from the Element ID field 1601, which is the leftmost field of the frame format illustrated in FIG. 16. Furthermore, at least one of the fields and sub-fields illustrated in FIG. 16 can be omitted.

If the result of determination in step S406 is YES, then in step S407, the communication apparatus 103 determines whether the SAE Password Identifiers In Use sub-field 1604 illustrated in FIG. 16 is included in the received ECE sub-field. The communication apparatus 103 uses the length of the ECE sub-field as a basis to determine whether the SAE Password Identifiers In Use sub-field 1604 is included. In a case where the ECE sub-field has a length larger than or equal to a predetermined length, the communication apparatus 103 determines that the SAE Password Identifiers In Use sub-field 1604 is included.

On the other hand, in a case where the length of the ECE sub-field is smaller than the predetermined length, the communication apparatus 103 determines that the SAE Password Identifiers In Use sub-field 1604 is not included. If it is determined that the SAE Password Identifiers In Use sub-field 1604 is included in the received ECE sub-field (YES in step S407), the communication apparatus 103 advances the processing to step S408. On the other hand, if it is determined that the SAE Password Identifiers In Use sub-field 1604 is not included in the received ECE sub-field (NO in step S407), the communication apparatus 103 advances the processing to step S413.

In step S408, the communication apparatus 103 determines whether the SAE Password Identifiers In Use sub-field 1604 indicates ON. The SAE Password Identifiers In Use sub-field 1604 includes information indicating whether a transmission apparatus for the SAE Password Identifiers In Use sub-field 1604 uses a password ID. Specifically, the information indicates whether one or more passwords, out of the passwords which the transmission apparatus uses, use a password ID. When one or more passwords are passwords using a password ID, the value of the SAE Password Identifiers In Use sub-field 1604 becomes "1". On the other hand, in a case where the communication apparatus is not setting a password ID for a password used to access a network, the value of the SAE Password Identifiers In Use sub-field 1604 becomes "0".

Moreover, in a case where a password itself used to access a network is not set by the communication apparatus, the value of the SAE Password Identifiers In Use sub-field 1604 becomes "0". Moreover, in a case where the communication apparatus does not set a password ID with respect to any password, the value of the SAE Password Identifiers In Use sub-field 1604 also becomes "0". If it is determined that the value "1" is included in the SAE Password Identifiers In Use sub-field 1604 (YES in step S408), the communication apparatus 103 advances the processing to step S409. On the other hand, if it is determined that the value "0" is included in the SAE Password Identifiers In Use sub-field 1604 (NO in step S408), the communication apparatus 103 advances the processing to step S411.

Next, in step S409, the communication apparatus 103 determines whether the SAE Password Identifiers Used Exclusively sub-field 1606 illustrated in FIG. 16 is included in the received ECE sub-field. If it is determined that the SAE Password Identifiers Used Exclusively sub-field 1606 is included in the ECE sub-field (YES in step S409), the communication apparatus 103 advances the processing to step S410. On the other hand, if it is determined that the SAE Password Identifiers Used Exclusively sub-field 1606 is not included in the ECE sub-field (NO in step S409), the communication apparatus 103 advances the processing to step S413.

Next, in step S410, the communication apparatus 103 determines whether the SAE Password Identifiers Used Exclusively sub-field 1606 indicates ON. The SAE Password Identifiers Used Exclusively sub-field 1606 includes information indicating whether all of the passwords which a transmission apparatus for the SAE Password Identifiers Used Exclusively sub-field 1606 sets use a password ID. In a case where all of the passwords which the transmission apparatus sets are passwords using a password ID, the value included in the SAE Password Identifiers Used Exclusively sub-field 1606 becomes "1". Otherwise, i.e., in a case where at least one password does not use a password ID, the value included in the SAE Password Identifiers Used Exclusively sub-field 1606 becomes "0". If it is determined that the value included in the SAE Password Identifiers Used Exclusively sub-field 1606 is "1" (YES in step S410), the communication apparatus 103 advances the processing to step S412. On the other hand, if it is determined that the value included in the SAE Password Identifiers Used Exclusively sub-field 1606 is "0" (NO in step S410), the communication apparatus 103 advances the processing to step S413.

In step S412, the communication apparatus 103 displays, on the display unit, an input screen available for inputting both a password and a password ID. FIG. 10B illustrates an example of a screen which the communication apparatus 103 displays in this case. Furthermore, FIG. 10A is a figure similar to FIG. 9A. In the UI illustrated in FIG. 10B, both an entry field for a password ID and an entry field for a password are displayed as entry fields. When viewing a UI in which an entry field for a password ID is displayed, the user is able to readily recognize that not only a password but also a password ID is essential for connection to the selected AP. Furthermore, in the present screen, the communication apparatus 103 displays a "Connect" button on the screen in gray-out form until the user inputs both a password and a password ID, and, in response to both a password and a password ID being input, the communication apparatus 103 performs switching in such a way as to display the "Connect" button in a pressable manner. This enables the user to more clearly recognize that a password ID is essential for connection to the selected AP.

Furthermore, in a case where the result of determination in each of steps S406, S407, S409, and S410 is NO, then in step S413, the communication apparatus 103 transmits Simultaneous Authentication of Equals (SAE) Commit with a clearly erroneous password set therein to the AP selected by the user. The clearly erroneous password is, for example, a password the password length of which is "0". Furthermore, the communication apparatus 103 does not set a password ID with respect to the SAE Commit to be transmitted in step S413.

Alternatively, in a case where the result of determination in each of steps S406, S407, S409, and S410 is NO, the communication apparatus 103 can be configured to perform processing in step S411.

Next, in step S414, the communication apparatus 103 receives SAE Commit from the selected AP as a response to the transmitted SAE Commit.

In step S415, the communication apparatus 103 determines whether Status Code included in the received SAE Commit indicates Success. If it is determined that the Status Code indicates Success (YES in step S415), the communication apparatus 103 advances the processing to step S416. On the other hand, if it is determined that the Status Code does not indicate Success (NO in step S415), the communication apparatus 103 advances the processing to step S417. Furthermore, the case where the Status Code does not indicate Success is a case where, for example, the Status Code is UNKNOWN_PASSWORD_IDENTIFIER, REFUSED, or REFUSED_REASON_UNSPECIFIED.

Furthermore, in a case where the communication apparatus 103 has not received SAE Commit from a partner apparatus until a predetermined time elapses after the communication apparatus 103 transmits SAE Commit in step S413, the communication apparatus 103 skips steps S414 and S415 and advances the processing to step S417.

If the result of determination in step S415 is YES, then in step S416, the communication apparatus 103 displays, as an input screen, a screen for allowing the user to input a password and allowing the user to input a password ID as an option. If the result of determination in step S415 is YES, i.e., if the Status Code indicates Success, it is meant that a password which does not require a password ID is included in the passwords set by the selected AP. However, there is a possibility that a password with a password ID set therein is included in the passwords. Therefore, the communication apparatus 103 displays, on the display unit, a screen available for inputting a password ID as an option. FIG. 11B illustrates an example of a screen which the communication apparatus 103 displays in this case. Furthermore, FIG. 11A is a figure similar to FIG. 9A. As illustrated in FIG. 11B, the communication apparatus 103 displays an option indicating "enter a password ID", thus enabling the user to readily recognize that inputting of a password ID is not essential but optional.

Figure 12:
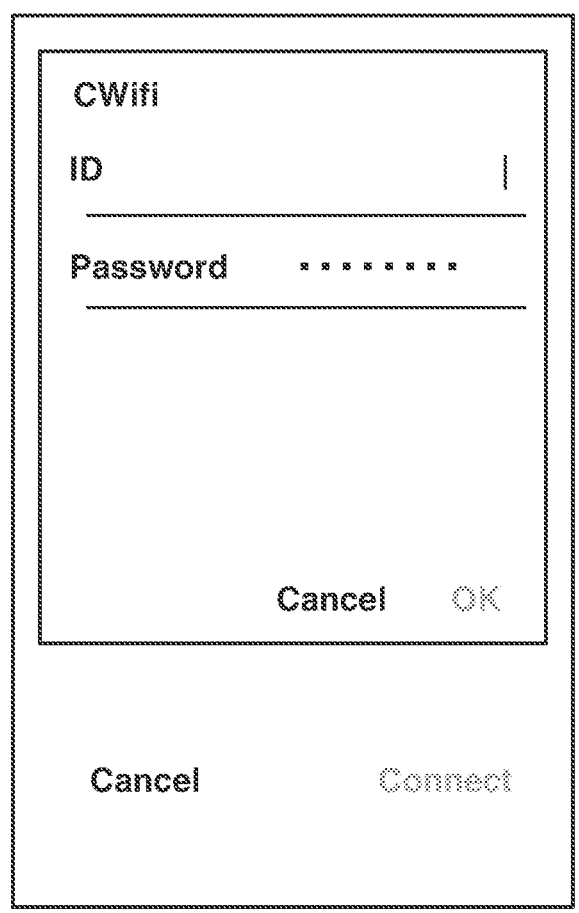
FIG. 12 is a diagram illustrating another example of a graphical user interface which the communication apparatus displays according to one embodiment.

FIG. 12 illustrates an example of a screen which the communication apparatus 103 displays in a case where the option "enter a password ID" has been selected in the screen illustrated in FIG. 11B. As illustrated in FIG. 12, in the present screen, an entry field for a password ID and an entry field for a password are displayed. Furthermore, in the present screen, the communication apparatus 103 can display a "Connect" button on the screen in gray-out form until the user inputs both a password and a password ID, and, in response to both a password and a password ID being input, the communication apparatus 103 can perform switching in such a way as to display the "Connect" button in a pressable manner.

Alternatively, in step S416, the communication apparatus 103 can display a screen such as that illustrated in FIG. 13B. Furthermore, FIG. 13A is a figure similar to FIG. 9A. In the screen illustrated in FIG. 13B, in addition to an entry field for a password, an option indicating "detailed option" for transitioning to a screen used for setting concerning connection to the selected AP is displayed. The user is able to input a password ID in a screen obtained by selection of "detailed option". Moreover, in the screen obtained after transition, in addition to a password ID, for example, an encryption method or a usable frequency band can be configured to be settable.

If the result of determination in step S415 is NO, then in step S417, the communication apparatus 103 displays, on the display unit, an input screen available for inputting both a password and a password ID. Processing in the present step is similar to that in step S412.

Furthermore, the communication apparatus 103 can perform, instead of processing in step S413, processing in step S416. Thus, instead of transmitting SAE Commit, the communication apparatus 103 can display a password input screen in such a way as to allow a password ID to be input as an option. Alternatively, the communication apparatus 103 can perform, instead of processing in step S416, processing in step S411. Thus, instead of transmitting SAE Commit, the communication apparatus 103 can display an input screen for inputting only a password.

As described above with reference to FIG. 4, the communication apparatus 103, which is an STA, determines, based on information included in a Beacon frame or Probe Response frame received from the selected AP, whether a password ID is required for connection to the selected AP. Then, the communication apparatus 103 displays an appropriate input screen based on a result of determination, thus enabling the user to readily recognize that a password ID is required for connection to the selected AP. This enables the user of the STA to readily set necessary parameters for connection to the selected AP.

Figure 5:
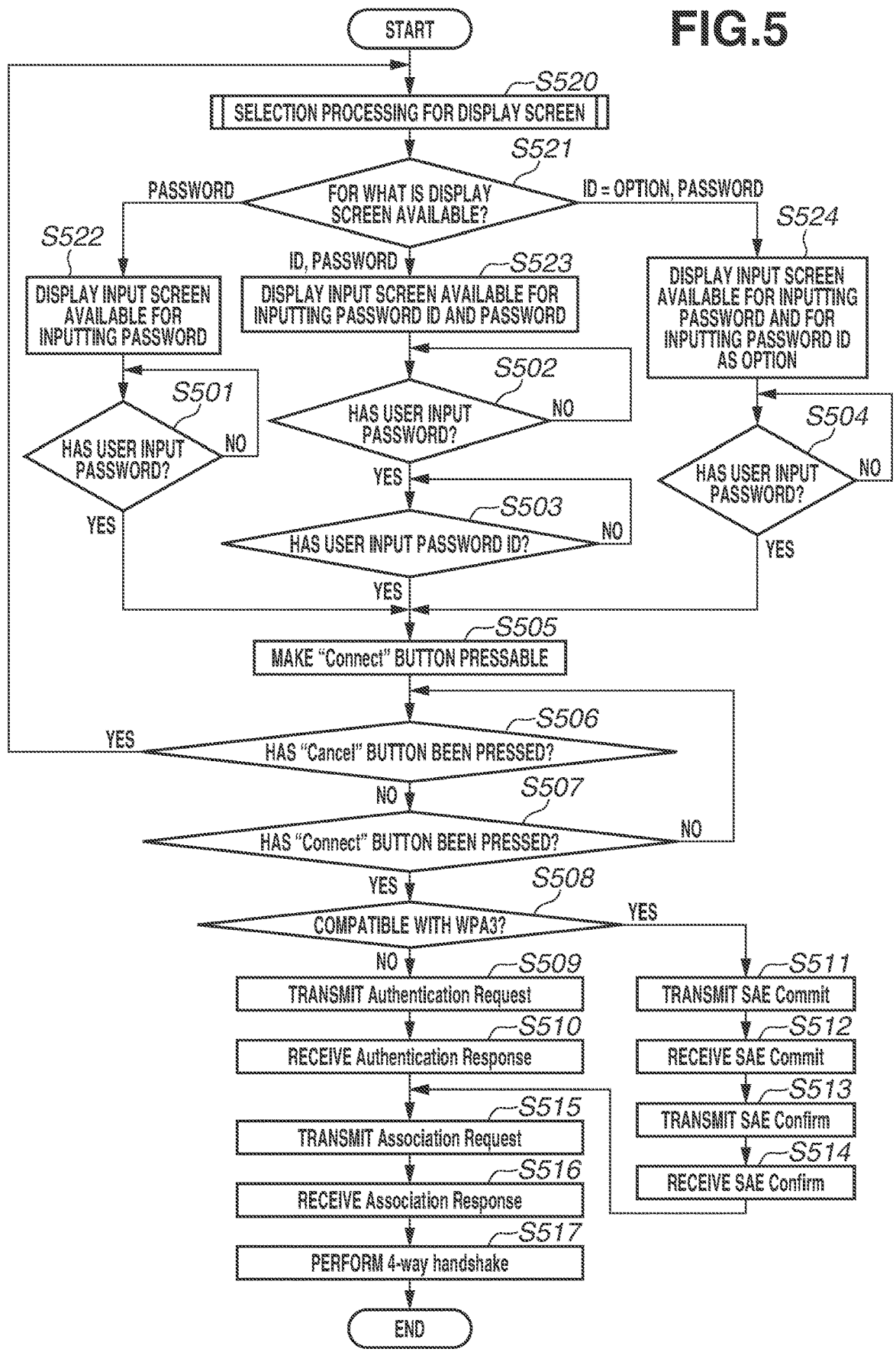
FIG. 5 is a flowchart illustrating processing which the communication apparatus performs to perform connection processing for connection to the other communication apparatus according to one embodiment.

FIG. 5 is a flowchart of processing which the communication apparatus 103 performs to execute connection processing to the communication apparatus 102. A trigger for starting of the processing illustrated in FIG. 5 is similar to that described with reference to FIG. 4.

The communication apparatus 103 performs processing illustrated in the flowchart of FIG. 4, and selects a screen to be displayed, based on a Beacon frame or a Probe Response frame received from an AP (communication apparatus 102) aimed at connection. Steps S520 to S524 illustrated in FIG. 5 are equivalent to the processing in the flowchart of FIG. 4. Particularly, step S522 is equivalent to step S411 illustrated in FIG. 4, step S523 is equivalent to steps S412 and S417 illustrated in FIG. 4, and step S524 is equivalent to step S416 illustrated in FIG. 4.

Upon displaying, on the display unit, an input screen not having an entry field for a password ID but having an entry field for a password, then in step S501, the communication apparatus 103 determines whether the user has input a password. The communication apparatus 103 performs this determination based on whether the user has input one or more letters of characters, numerals, or symbols to an entry field for a password. Alternatively, the communication apparatus 103 can perform this determination based on whether at least any one of a character set, a numeral set, or symbol set having letters the number of which is greater than or equal to the number of a plurality of letters set by default in the communication apparatus 103 has been input. If it is determined that the user has not yet input a password (NO in step S501), the communication apparatus 103 re-performs processing in step S501. On the other hand, if it is determined that the user has input a password (YES in step S501), the communication apparatus 103 advances the processing to step S505.

In the case of having displayed, on the display unit, an input screen having an entry field for a password ID and an entry field for a password, then in step S502, the communication apparatus 103 determines whether the user has input a password.

Processing in step S502 is performed in a manner similar to that in step S501. If the result of determination in step S502 is NO (NO in step S502), the communication apparatus 103 re-performs processing in step S502. If the result of determination in step S502 is YES (YES in step S502), the communication apparatus 103 advances the processing to step S503.

In step S503, the communication apparatus 103 determines whether the user has input a password ID. The determination in step S503 is performed in a manner similar to that in the case of a password described in step S501. If the result of determination in step S503 is NO (NO in step S503), the communication apparatus 103 re-performs processing in step S503. If the result of determination in step S503 is YES (YES in step S503), the communication apparatus 103 advances the processing to step S505. Furthermore, the order of processing operations in steps S502 and S503 can be reversed.

In the case of having displayed, on the display unit, an input screen available for inputting a password ID as an option and having an entry field for a password, then in step S504, the communication apparatus 103 determines whether the user has input a password. Processing in step S504 is similar to that in step S501. If the result of determination in step S504 is NO (NO in step S504), the communication apparatus 103 re-performs processing in step S504. If the result of determination in step S504 is YES (YES in step S504), the communication apparatus 103 advances the processing to step S505.

In step S505, the communication apparatus 103 performs switching to make the "Connect" button displayed on the display unit pressable. The communication apparatus 103 displays the "Connect" button in a state of being unable to be pressed until the user inputs information required for connection to the AP and switches the "Connect" button to a state of being able to be pressed after the user inputs the required information, thus preventing inadvertently trying to connect to the AP before the user inputs the required information. Furthermore, in the case of displaying the "Connect" button in a state of being pressable regardless of an inputting state of information required for connection, the communication apparatus 103 omits step S505.

In step S506, the communication apparatus 103 determines whether a "Cancel" button displayed on the display unit has been pressed. The "Cancel" button is a button used to cancel connection to the AP, and is a button displayed in the input screen displayed in steps S522 to S524. If it is determined that the "Cancel" button has been pressed (YES in step S506), the communication apparatus 103 advances the processing to step S520. Alternatively, if the result of determination in step S506 is YES, the communication apparatus 103 can return the processing to step S402 illustrated in FIG. 4, or can ends the processing in the present flowchart. If it is determined that the "Cancel" button has not been pressed (NO in step S506), the communication apparatus 103 advances the processing to step S507. Furthermore, the communication apparatus 103 can perform determination in step S506 in parallel with processing in steps S520 to S524 and processing in steps S501 to S505.

In step S507, the communication apparatus 103 determines whether the "Connect" button has been pressed. If it is determined that the "Connect" button has been pressed (YES in step S507), the communication apparatus 103 advances the processing to step S508. On the other hand, if it is determined that the "Connect" button has not been pressed (NO in step S507), the communication apparatus 103 returns the processing to step S506.

Next, in step S508, the communication apparatus 103 determines whether the AP targeted for connection is compatible with WPA3. The determination in step S508 is similar to that in step S404 illustrated in FIG. 4. Alternatively, the communication apparatus 103 can perform determination in step S508 by referring to the result of determination in step S404 illustrated in FIG. 4. If the result of determination in step S508 is YES (YES in step S508), the communication apparatus 103 advances the processing to step S511. If the result of determination in step S508 is NO (NO in step S508), the communication apparatus 103 advances the processing to step S509.

In step S509, the communication apparatus 103 transmits an Authentication Request to the AP. Next, in step S510, the communication apparatus 103 receives an Authentication Response from the AP. Furthermore, in the case of having not received an Authentication Response until a predetermined time elapses after performing processing in step S509, the communication apparatus 103 can issue an error notification and end the processing in the present flowchart. Alternatively, the communication apparatus 103 can issue an error notification and, in steps S522 to S524, display a screen which the communication apparatus 103 has displayed when trying to connect to the AP to which the communication apparatus 103 has transmitted an Authentication Request in step S509. After performing processing in step S510, the communication apparatus 103 advances the processing to step S515.

If it is determined that the AP is compatible with WPA3 (YES in step S508), then in step S511, the communication apparatus 103 transmits SAE Commit to the AP. In a case where a password ID has been input to the input screen displayed in step S523 or S524, the value of the password ID itself or a value calculated based on the password ID is included as information in the SAE Commit to be transmitted in step S511.

Figure 17:
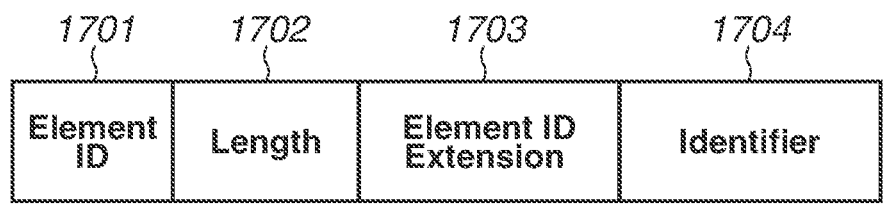
FIG. 17 is a diagram illustrating an example of a frame format of a Password Identifier element which the communication apparatus transmits according to one embodiment.

FIG. 17 illustrates an example of a frame format of Password Identifier element in which a password ID or a hash value thereof is included. The SAE Commit has a frame format similar to that illustrated in FIG. 14, and the Password Identifier element illustrated in FIG. 17 is included in the Frame Body field 1405. The Password Identifier element includes an Element ID field 1701, a Length field 1702, an Element ID Extension field 1703, and an Identifier field 1704. The communication apparatus 103 generates and transmits the above-mentioned fields in order from the Element ID field 1701, which is the leftmost field of the frame format illustrated in FIG. 17. Furthermore, at least one field of the frame format illustrated in FIG. 17 can be omitted.

The Element ID field 1701 includes a value "255" as information indicating that the present element is Password Identifier element. The Identifier field 1704 includes a value of the password ID itself input via the input screen, a hash value calculated based on the input password ID, or a decodable encrypted value of the password ID.

Next, in step S512, the communication apparatus 103 receives SAE Commit transmitted from the AP. The SAE Commit is a type of Authentication frame. Furthermore, in the case of having not received SAE Commit until a predetermined time elapses after performing processing in step S511, the communication apparatus 103 can issue an error notification and end the processing in the present flowchart. Alternatively, the communication apparatus 103 can issue an error notification and, in steps S522 to S524, display a screen which the communication apparatus 103 has displayed when trying to connect to the AP to which the communication apparatus 103 has transmitted SAE Commit in step S511.

In step S513, the communication apparatus 103 transmits SAE Confirm to the AP. Next, in step S514, the communication apparatus 103 receives SAE Confirm from the AP. The SAE Confirm is a type of Authentication frame. Furthermore, in the case of having not received SAE Confirm until a predetermined time elapses after performing processing in step S513, the communication apparatus 103 can issue an error notification and end the processing in the present flowchart. Alternatively, the communication apparatus 103 can issue an error notification and, in steps S522 to S524, display a screen which the communication apparatus 103 has displayed when trying to connect to the AP to which the communication apparatus 103 has transmitted SAE Confirm in step S513. After performing processing in step S514, the communication apparatus 103 advances the processing to step S515.

In step S515, the communication apparatus 103 transmits an Association Request to the AP. In step S516, the communication apparatus 103 receives an Association Response from the AP. In the case of having not received an Association Response until a predetermined time elapses after performing processing in step S515, the communication apparatus 103 can issue an error notification and end the processing in the present flowchart. Alternatively, the communication apparatus 103 can issue an error notification and, in steps S522 to S524, display a screen which the communication apparatus 103 has displayed when trying to connect to the AP to which the communication apparatus 103 has transmitted an Association Request in step S515.

Next, in step S517, the communication apparatus 103 performs 4-way handshake with the AP based on a Pairwise Master Key (PMK) which the communication apparatus 103 has generated in the processing performed up to this point with the AP. With processing in step S517 performed, a connection between the communication apparatus 103 and the AP (communication apparatus 102) is established and an encrypted communication is started.

As described above, with the processing illustrated in FIG. 5 performed, a connection between the communication apparatus 103 and the communication apparatus 102 is established.

FIG. 7 illustrates a sequence concerning displaying of a screen which the communication apparatus 103 performs in the processing in step S413 illustrated in FIG. 4 in the first example embodiment.

First, in step S701, the communication apparatus 103 displays a scan result. Specifically, the communication apparatus 103 displays a screen such as that illustrated in FIG. 10A. Next, in step S702, the communication apparatus 103 detects that an SSID has been selected by the user. In the present sequence, a case where any one of the results of determination in steps S406, S407, S409, and S410 in the processing illustrated in FIG. 4 is NO is assumed.

In step S703, the communication apparatus 103 transmits SAE Commit with a password the password length of which is "0" to the communication apparatus 102. In response to this, in step S704, the communication apparatus 102 transmits SAE Commit with Status Code set therein to the communication apparatus 103. In step S705, the communication apparatus 103 checks Status Code of the received SAE Commit Here, a case where Status Code does not indicate Success is assumed. In step S706, the communication apparatus 103 displays an input screen having entry fields for a password and a password ID. Specifically, the communication apparatus 103 displays a screen illustrated in FIG. 10B.

As described above, in the first example embodiment, the communication apparatus 103 displays an appropriate input screen for communication parameters based on information included in a Beacon frame or Probe Response frame received from the AP. This enables the user to readily recognize information required for connection to the selected AP and, particularly, become able to readily recognize whether inputting of a password ID is essential.

In the case of the first example embodiment, before being instructed by the user to connect to an AP, the communication apparatus 103 determines whether a password ID is required and then displays an appropriate input screen for communication parameters. In the case of a second example embodiment, after being instructed by the user to connect to an AP, the communication apparatus 103 determines whether a password ID is required and then displays an appropriate input screen. In the second example embodiment, only differences from the first example embodiment are described.

The configuration of a network in which the communication apparatus 103 participates is similar to that illustrated in FIG. 1. The functional configuration and hardware configuration of the communication apparatus 103 are similar to those illustrated in FIG. 2 and FIG. 3, respectively.

Figure 6A:
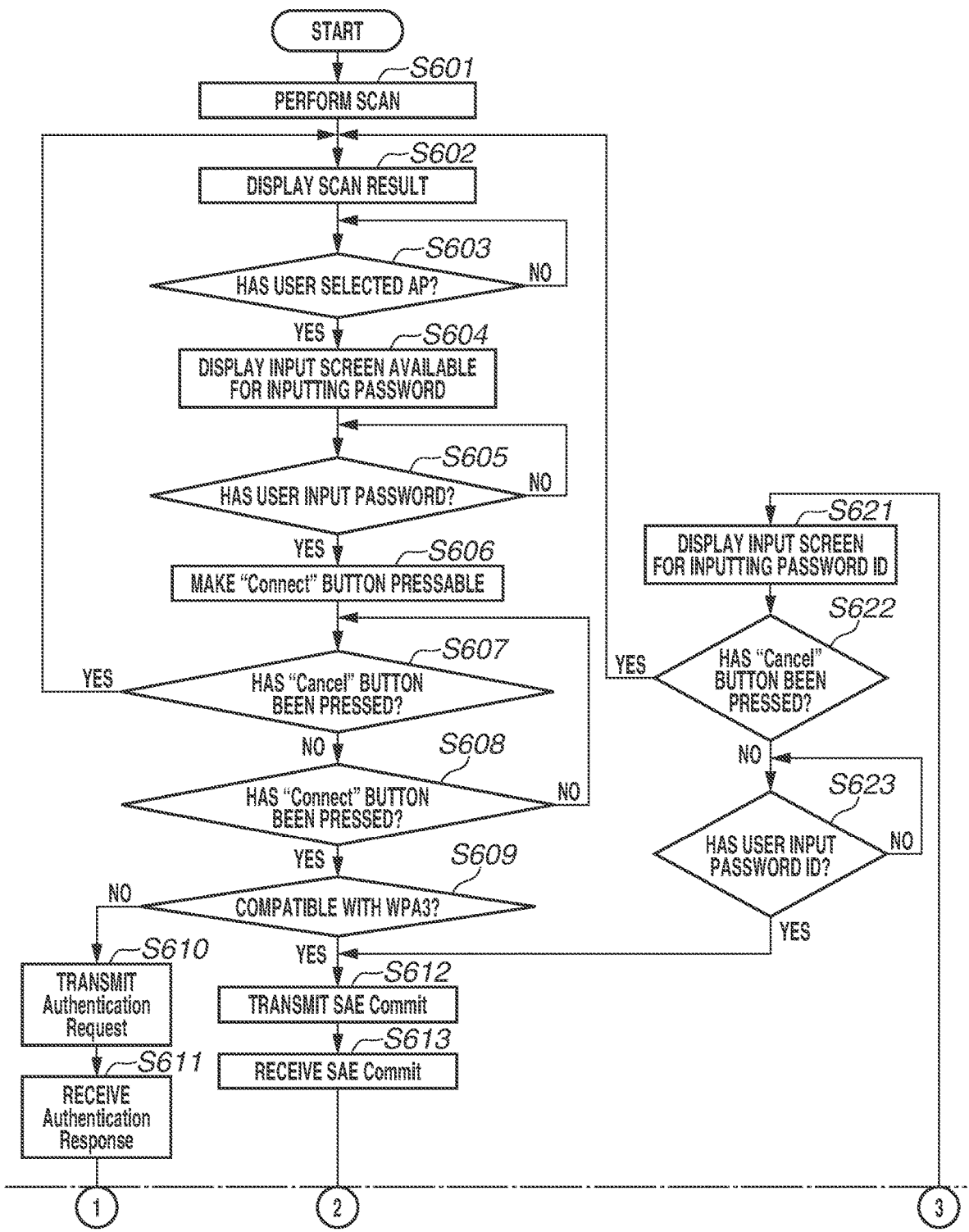
FIGS. 6A and 6B are other flowcharts illustrating processing which the communication apparatus performs to display a screen for inputting information required for connection to the other communication apparatus and perform connection processing for connection to the other communication apparatus according to one embodiment.
Figure 6B:
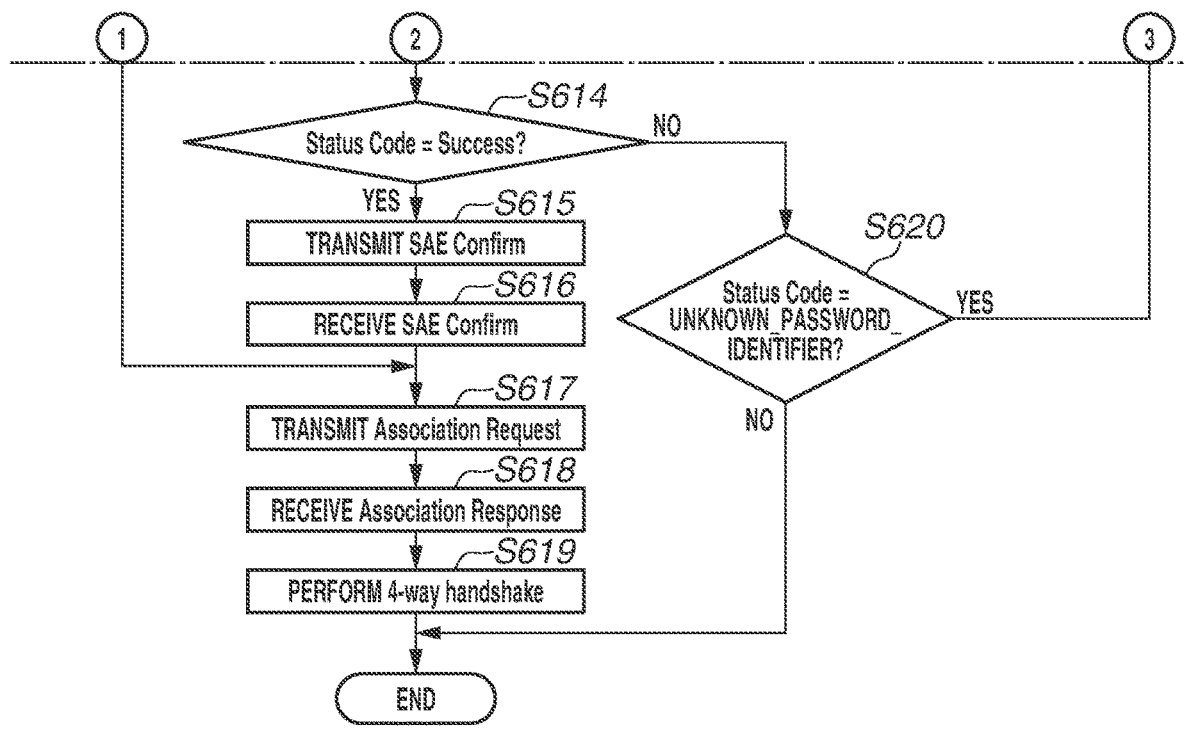

FIGS. 6A and 6B are flowcharts illustrating processing which the communication apparatus 103 performs to display a screen for inputting information required for connection to the communication apparatus 102 and perform connection processing. The trigger for starting of the processing illustrated in FIGS. 6A and 6B is similar to that described with reference to FIG. 4.

Processing operations in steps S601 to S603 illustrated in FIG. 6A are similar to those in steps S401 to S403 illustrated in FIG. 4. If the result of determination in step S603 is YES (YES in step S603), then in step S604, the communication apparatus 103 displays an input screen available for inputting a password. Specifically, the communication apparatus 103 displays a screen such as that illustrated in FIG. 9B. Alternatively, the communication apparatus 103 can display a screen such as that illustrated in FIG. 10B and display an entry field for a password ID in gray-out form, thus preventing the user from performing inputting thereof.

Next, in step S605, the communication apparatus 103 determines whether the user has input a password. If it is determined that the user has not input any password (NO in step S605), the communication apparatus 103 re-performs processing in step S605. On the other hand, if it is determined that the user has input a password (YES in step S605), the communication apparatus 103 advances the processing to step S606.

Processing operations in steps S606 to S608 are similar to those in steps S505 to S507 illustrated in FIG. 5.

Next, in step S609, the communication apparatus 103 determines whether the selected AP is compatible with WPA3. The determination method in step S609 is similar to that in step S404 illustrated in FIG. 4. If it is determined that the AP is compatible with WPA3 (YES in step S609), the communication apparatus 103 advances the processing to step S612.

On the other hand, if it is determined that the AP is not compatible with WPA3 (NO in step S609), the communication apparatus 103 advances the processing to step S610.

Processing operations in steps S610 to S613 are similar to those in steps S509 to S512 illustrated in FIG. 5.

In step S614, the communication apparatus 103 determines whether Status Code included in the received SAE Commit indicates Success. If it is determined that Status Code indicates Success (YES in step S614), the communication apparatus 103 advances the processing to step S615.

On the other hand, if it is determined that Status Code does not indicate Success (NO in step S614), the communication apparatus 103 advances the processing to step S620.

Next, in step S620, the communication apparatus 103 determines whether Status Code included in the received SAE Commit is UNKNOWN_PASSWORD_IDENTIFIER. If it is determined that Status Code is not UNKNOWN_PASSWORD_IDENTIFIER (NO in step S620), the communication apparatus 103 ends the processing in the present flowchart. On the other hand, if it is determined that Status Code is UNKNOWN_PASSWORD_IDENTIFIER (YES in step S620), the communication apparatus 103 advances the processing to step S621.

Since, in a case where Status Code is UNKNOWN_PASSWORD_IDENTIFIER, a password ID is required for connection to the AP, in step S621, the communication apparatus 103 displays an input screen for a password ID. The communication apparatus 103 displays an input screen having both input screens for a password and a password ID such as that illustrated in FIG. 12. In this case, the communication apparatus 103 can display the input screen with a password input in step S605 already indicated in the entry field for a password. Alternatively, the communication apparatus 103 can display an input screen having only an entry field for a password ID.

In step S622, the communication apparatus 103 determines whether the "Cancel" button has been pressed by the user. If it is determined that the "Cancel" button has been pressed (YES in step S622), the communication apparatus 103 advances the processing to step S602. On the other hand, if it is determined that the "Cancel" button has not been pressed (NO in step S622), the communication apparatus 103 advances the processing to step S623.

A processing operation in step S623 is similar to that in step S503 illustrated in FIG. 5. If the result of determination in step S623 is YES (YES in step S623), the communication apparatus 103 advances the processing to step S612. The SAE Commit which is transmitted in step S612 includes information that is based on the password ID input in step S623.

On the other hand, if the result of determination in step S614 is YES (YES in step S614), the communication apparatus 103 advances the processing to step S615. Processing operations in steps S615 to S619 are similar to those in steps S513 to S517 illustrated in FIG. 5.

As described above, with the processing illustrated in FIGS. 6A and 6B performed, first, the communication apparatus 103 causes the user to input only a password and, after that, displays an input screen for a password ID as needed. This enables the user to readily recognize a case where a password ID is required.

FIG. 8 illustrates a sequence concerning displaying of a screen which the communication apparatus 103 performs in the processing in step S621 illustrated in FIG. 6A in the second example embodiment.

First, in step S801, the communication apparatus 103 displays a scan result. Specifically, the communication apparatus 103 displays a screen such as that illustrated in FIG. 10A. Next, in step S802, the communication apparatus 103 detects that an SSID has been selected by the user. In step S803, the communication apparatus 103 displays an input screen having an entry field for a password. Specifically, the communication apparatus 103 displays a screen such as that illustrated in FIG. 9B. Alternatively, the communication apparatus 103 can display a screen such as that illustrated in FIG. 10B and display an entry field for a password ID in gray-out form, thus preventing the user from performing inputting thereof. In step S804, the communication apparatus 103 receives an instruction for connection from the user. Specifically, the communication apparatus 103 receives, from the user, an operation of the "Connect" button being pressed.

Next, in step S805, the communication apparatus 103 transmits SAE Commit, and, in step S806, in response to this, the communication apparatus 103 receives SAE Commit from the communication apparatus 102. In step S807, the communication apparatus 103 checks Status Code included in the received SAE Commit Here, Status Code is assumed to be UNKNOWN_PASSWORD_IDENTIFIER. In step S808, the communication apparatus 103 displays an input screen for a password ID. When a password ID has been input, then in step S809, the communication apparatus 103 transmits SAE Commit to the communication apparatus 102 again, and, in step S810, in response to this, the communication apparatus 103 receives SAE Commit.

As described above, in the second example embodiment, in a case where a password ID is required after connection to the AP is tried, the communication apparatus 103 displays an input screen for a password ID.

The communication apparatus 103 can be a communication apparatus capable of performing only one of the processing described in the first example embodiment and the processing described in the second example embodiment, or can be a communication apparatus capable of performing both the processing described in the first example embodiment and the processing described in the second example embodiment. In a case where the communication apparatus 103 is capable of performing both the processing described in the first example embodiment and the processing described in the second example embodiment, the communication apparatus 103 is able to switch between the processing described in the first example embodiment and the processing described in the second example embodiment in response to a user instruction. Alternatively, not only this, the communication apparatus 103 can perform any one of the processing described in the first example embodiment and the processing described in the second example embodiment according to an application which is being executed.

Furthermore, unlike the first example embodiment and the second example embodiment, the communication apparatus 103 can be configured to first cause the user to input both a password and a password ID and then try to connect to the AP. In a case where a password ID is unnecessary, since connection is failed, then, the communication apparatus 103 can display an input screen having an entry field for only a password to be input by the user.

Furthermore, at least a part or the whole of the flowcharts for the communication apparatus 103 illustrated in FIG. 4 to FIGS. 6A and 6B can be implemented by hardware. In a case where it is implemented by hardware, for example, a complier can be used to generate a dedicated circuit on an FPGA based on computer programs for implementing the respective steps, and the generated dedicated circuit can be used. FPGA is an abbreviation for Field Programmable Gate Array. Moreover, a Gate Array circuit can be formed as with an FPGA and can be used as hardware for implementation. Moreover, an application specific integrated circuit (ASIC) can also be used for implementation.

According to various embodiments of the present disclosure, with respect to connection to a wireless network, it becomes possible to readily discriminate whether an identifier different from an SSID or password is required, thus improving convenience.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-162161 filed Sep. 28, 2020, which is hereby incorporated by reference herein in its entirety.

What is claimed is:

1. A communication apparatus comprising:
at least one memory that stores a set of instructions; and
at least one processor that executes the instructions, the instructions, when executed, causing the communication apparatus to perform operations comprising:
receiving, from another communication apparatus, information about a wireless network identified by a service set identifier (SSID);
selecting a screen to be displayed from among at least a first input screen and a second input screen, wherein selecting the screen to be displayed comprises:
determining, based on the information about the wireless network, whether a password identifier is a required parameter for connection to the another communication apparatus forming the wireless network, the password identifier being associated with a password used to access the wireless network, the password identifier being different from the SSID of the wireless network and different from the password used to access the wireless network; and
selecting the screen to be displayed based on a result of the determining; and
controlling a display to display the selected screen, wherein controlling the display to display the selected screen comprises:
in a case where it is determined in the determining that the password identifier is not a required parameter for the connection to the another communication apparatus, displaying the first input screen on the display, wherein the first input screen includes a first display item for receiving an input of a character string corresponding to the password used to access the wireless network and does not include a display item for receiving an input of a character string corresponding to the password identifier, and,
in a case where it is determined in the determining that the password identifier is a required parameter for the connection to the another communication apparatus, displaying the second input screen on the display, wherein the second input screen includes a second display item for receiving an input of the character string corresponding to the password used to access the wireless network and a third display item for receiving an input of the character string corresponding to the password identifier.

2. The communication apparatus according to claim 1, wherein the first input screen further includes a fourth display item for notifying a user that an input of the password identifier cannot be received in such a manner that the fourth display item is displayed in gray-out form.

3. The communication apparatus according to claim 1, wherein, in the determining,
in a case where the information about the wireless network includes first information indicating that the another communication apparatus uses the password identifier as a communication parameter, it is determined, based on the first information, that the password identifier is a required parameter for the connection to the another communication apparatus, and,
in a case where the information about the wireless network includes second information indicating that the another communication apparatus does not use the password identifier as a communication parameter, it is determined, based on the second information, that the password identifier is not a required parameter for the connection to the another communication apparatus.

4. The communication apparatus according to claim 1, wherein the information about the wireless network includes a Simultaneous Authentication of Equals (SAE) Password Identifiers In Use sub-field, and
wherein the determining comprises determining whether the password identifier is a required parameter for the connection to the another communication apparatus based on a value specified in the SAE Password Identifiers In Use sub-field.

5. The communication apparatus according to claim 1, wherein the password identifier is a password identifier (ID) compliant with Wi-Fi Protected Access 3 (WPA3).

6. The communication apparatus according to claim 1, wherein the display is included in the communication apparatus.

7. The communication apparatus according to claim 1, wherein the information about the wireless network is a Beacon frame received from the another communication apparatus.

8. The communication apparatus according to claim 1, wherein the information about the wireless network is a Probe Response frame received from the another communication apparatus.

9. The communication apparatus according to claim 1, wherein the determining whether the password identifier is a required parameter for the connection to the another communication apparatus comprises:
transmitting, to the another communication apparatus, a Simultaneous Authentication of Equals (SAE) Commit based on the information about the wireless network;
receiving, from the another communication apparatus, a response to the SAE Commit; and
determining whether the password identifier is a required parameter for the connection to the another communication apparatus based on the response to the SAE Commit.

10. The communication apparatus according to claim 1, wherein the first input screen further includes information indicating that inputting of the password identifier is optional.

11. The communication apparatus according to claim 1, wherein the first input screen further includes a selectable display item enabling a user, by providing a user input indicating selection of the selectable display item, to access a third input screen for inputting the password identifier.

12. A control method for a communication apparatus, the control method comprising:
- receiving, from another communication apparatus, information about a wireless network identified by a service set identifier (SSID);
- selecting a screen to be displayed from among at least a first input screen and a second input screen, wherein selecting the screen to be displayed comprises:
  - determining, based on the information about the wireless network, whether, a password identifier is a required parameter for connection to the another communication apparatus forming the wireless network, the password identifier being associated with a password used to access the wireless network, the password identifier being different from the SSID of the wireless network and different from the password used to access the wireless network; and
  - selecting the screen to be displayed based on a result of the determining; and
- controlling a display to display the selected screen, wherein controlling the display to display the selected screen comprises:
  - in a case where it is determined in the determining that the password identifier is not a required parameter for the connection to the another communication apparatus, displaying the first input screen on the display, wherein the first input screen includes a first display item for receiving an input of a character string corresponding to the password used to access the wireless network and does not include a display item for receiving an input of a character string corresponding to the password identifier, and,
  - in a case where it is determined in the determining that the password identifier is a required parameter for the connection to the another communication apparatus, displaying the second input screen on the display, wherein the second input screen includes a second display item for receiving an input of the character string corresponding to the password used to access the wireless network and a third display item for receiving an input of the character string corresponding to the password identifier.

13. A non-transitory computer-readable storage medium storing computer-executable instructions that, when executed by a computer, cause the computer to perform a control method for a communication apparatus, the control method comprising:
- receiving, from another communication apparatus, information about a wireless network identified by a service set identifier (SSID);
- selecting a screen to be displayed from among at least a first input screen and a second input screen, wherein selecting the screen to be displayed comprises:
  - determining, based on the information about the wireless network, whether a password identifier is a required parameter for connection to the another communication apparatus forming the wireless network, the password identifier being associated with a password used to access the wireless network, the password identifier being different from the SSID of the wireless network and different from the password used to access the wireless network; and
  - selecting the screen to be displayed based on a result of the determining; and
- controlling a display to display the selected screen, wherein controlling the display to display the selected screen comprises:
  - in a case where it is determined in the determining that the password identifier is not a required parameter for the connection to the another communication apparatus, displaying the first input screen on the display, wherein the first input screen includes a first display item for receiving an input of a character string corresponding to the password used to access the wireless network and does not include a display item for receiving an input of a character string corresponding to the password identifier, and,
  - in a case where it is determined in the determining that the password identifier is a required parameter for the connection to the another communication apparatus, displaying the second input screen on the display, wherein the second input screen includes a second display item for receiving an input of the character string corresponding to the password used to access the wireless network and a third display item for receiving an input of the character string corresponding to the password identifier.

* * * * *